United States Patent
Matsumoto et al.

(10) Patent No.: US 11,741,243 B1
(45) Date of Patent: Aug. 29, 2023

(54) METHOD FOR USING REDUNDANT ENCRYPTION TO SECURE DATA IN SUPERVISORY CONTROL SYSTEMS

(71) Applicants: Sumitaka Matsumoto, Tokyo (JP); Takafumi Nishida, Tokyo (JP); Paul Jan Long, San Francisco, CA (US); Ian L Sayers, South Shields (GB)

(72) Inventors: Sumitaka Matsumoto, Tokyo (JP); Takafumi Nishida, Tokyo (JP); Paul Jan Long, San Francisco, CA (US); Ian L Sayers, South Shields (GB)

( * ) Notice: Subject to any disclaimer, the term of this patent is extended or adjusted under 35 U.S.C. 154(b) by 0 days.

(21) Appl. No.: 18/129,727

(22) Filed: Mar. 31, 2023

(51) Int. Cl.
  *G06F 21/60* (2013.01)
  *G05B 15/02* (2006.01)
(52) U.S. Cl.
  CPC ........... *G06F 21/602* (2013.01); *G05B 15/02* (2013.01)
(58) Field of Classification Search
  CPC .............................. G06F 21/602; G05B 15/02
  See application file for complete search history.

(56) References Cited

U.S. PATENT DOCUMENTS

| | | | |
|---|---|---|---|
| 10,757,229 B2 * | 8/2020 | Jeong | H04L 67/12 |
| 2013/0159489 A1 * | 6/2013 | Cha | H04L 65/611 |
| | | | 709/223 |
| 2018/0343326 A1 * | 11/2018 | Wildfeuer | H04L 69/085 |

* cited by examiner

*Primary Examiner* — Abiy Getachew

(57) ABSTRACT

The invention described herein addresses the security shortcomings in existing Supervisory Control Systems (SCS), inclusive of but not limited to CAN Bus, SCADA, DCS, HEMS and IoT. The invention references U.S. Pat. No. 10,367,794 B2 Sayers et al., which is improved by the addition of a Validated Transmission data system, a Receiver Validation data system, and redundant links, which may be comprised of but not limited to technologies such as fiberoptics, time division multiplexing, frequency division multiplexing, various radio frequency links inclusive of TDM, OFDM, and CDMA modulation schemes, and a novel scheme for validating transmissions through self-generated tables by network elements.

24 Claims, 12 Drawing Sheets

FIG. 1: (PRIOR ART) Controller Area Network (CAN Bus) Architecture
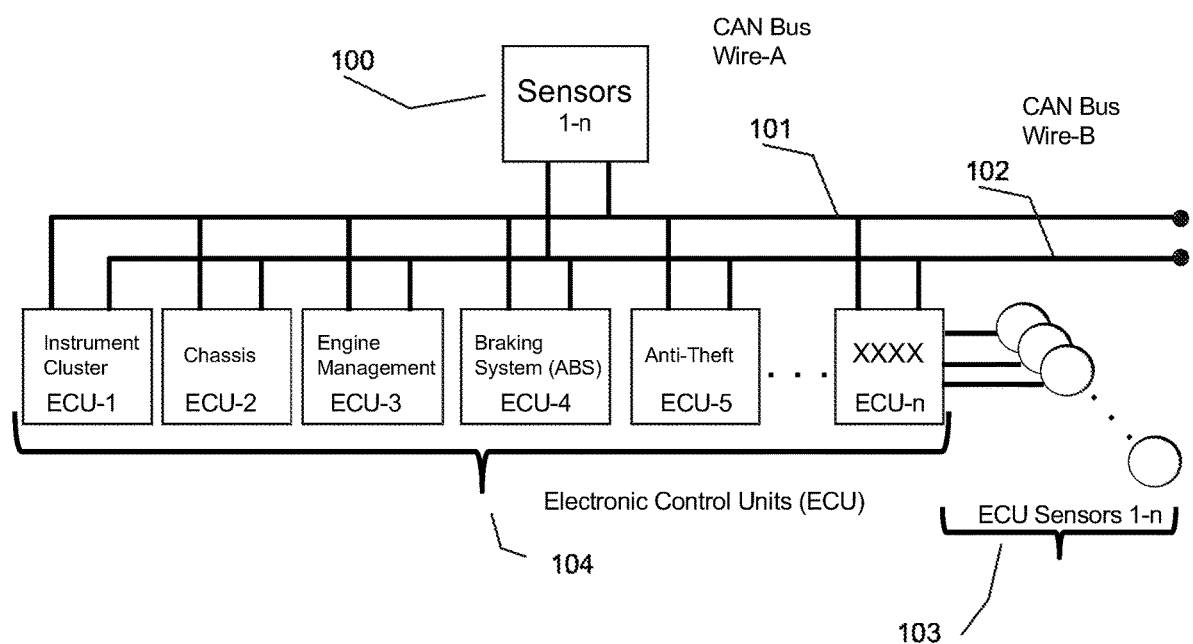

FIG. 2: (PRIOR ART) CAN Bus Protocol Structure

| Field | | Start of Frame | Arbitration | Control | Data | CRC | ACK | End of File | Interframe Spacing |
|---|---|---|---|---|---|---|---|---|---|
| CAN 2.0 | Bits | 1 | 12 | 6 | 64 | 16 | 2 | 7 | 3 |
| CAN Extended | Bits | 1 | 13 | 25 | 64 | 16 | 2 | 7 | 3 |
| CAN-Flexible Data (FD) | Bits | 1 | 12 | 9 | 512 | 18/22 | 2 | 7 | 3 |

200, 201, 202, 203, 204, 205, 206, 207, 208, 209

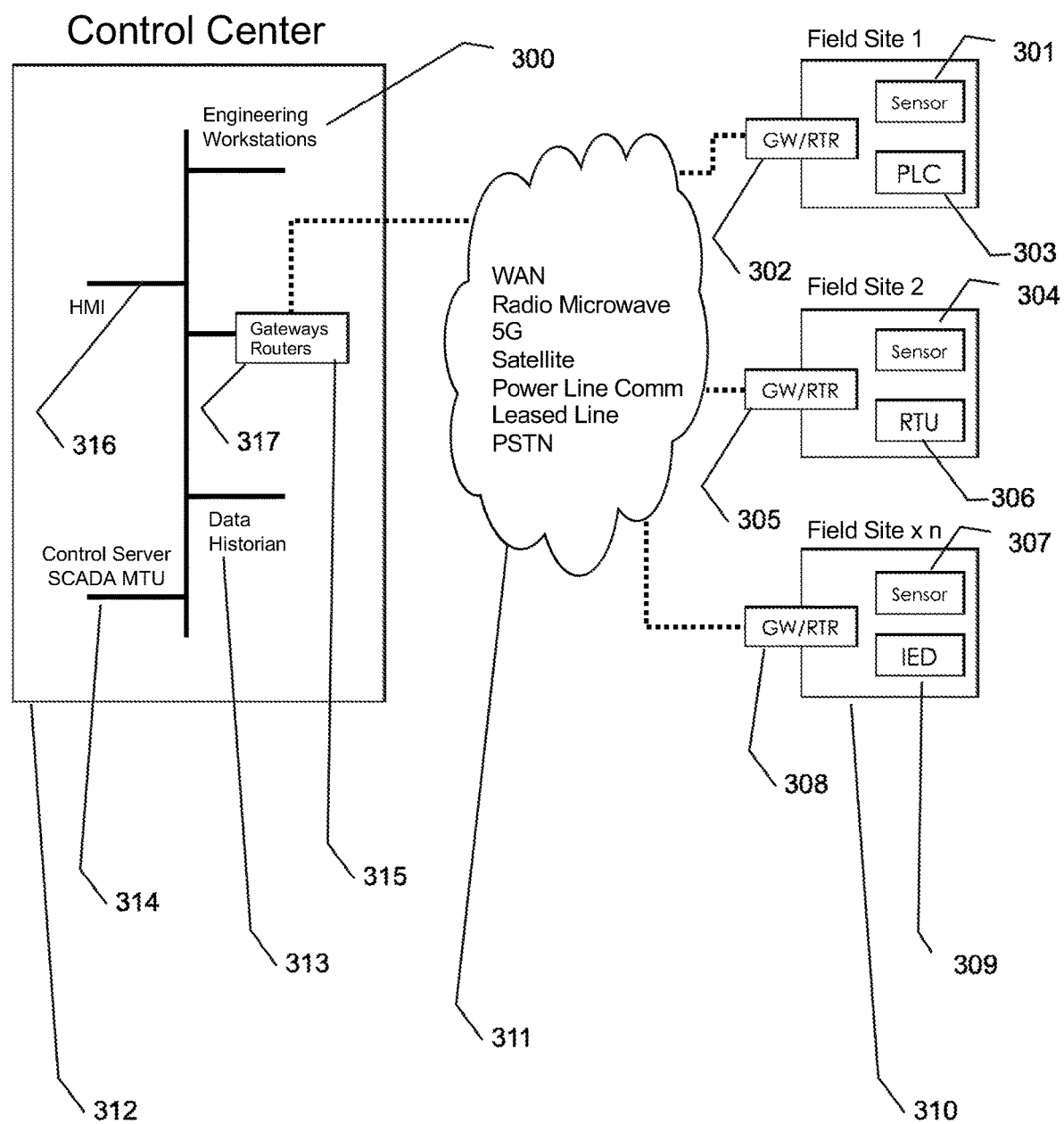
FIG. 3: (PRIOR ART) Supervisory Control and Data Acquisition (SCADA) Architecture

FIG. 4: (PRIOR ART) MODBUS Frame Architecture
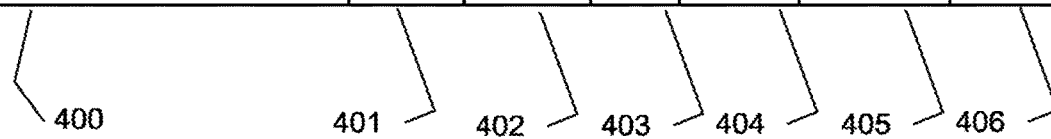

FIG. 5: (PRIOR ART) DNP3 Frame Architecture
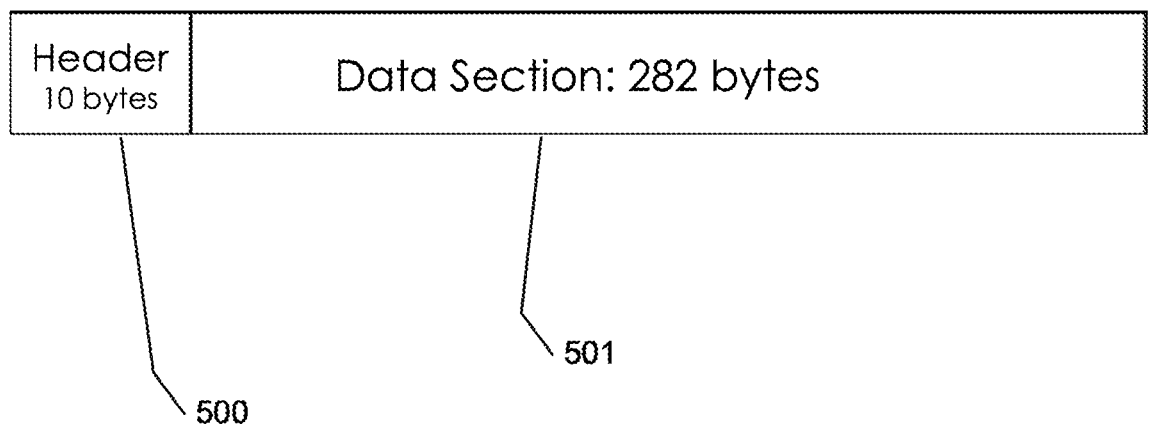

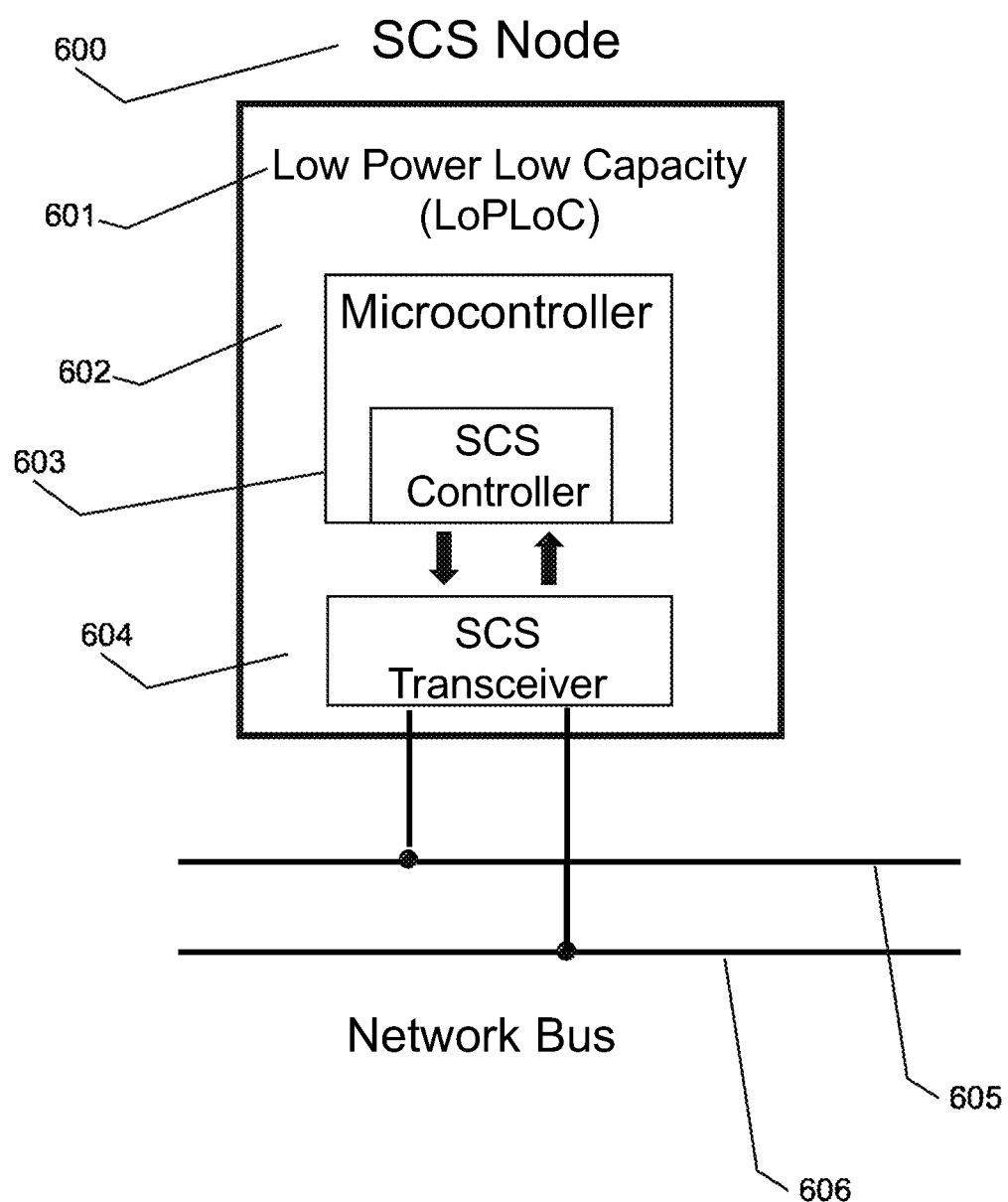
FIG. 6: (PRIOR ART) SCS Node

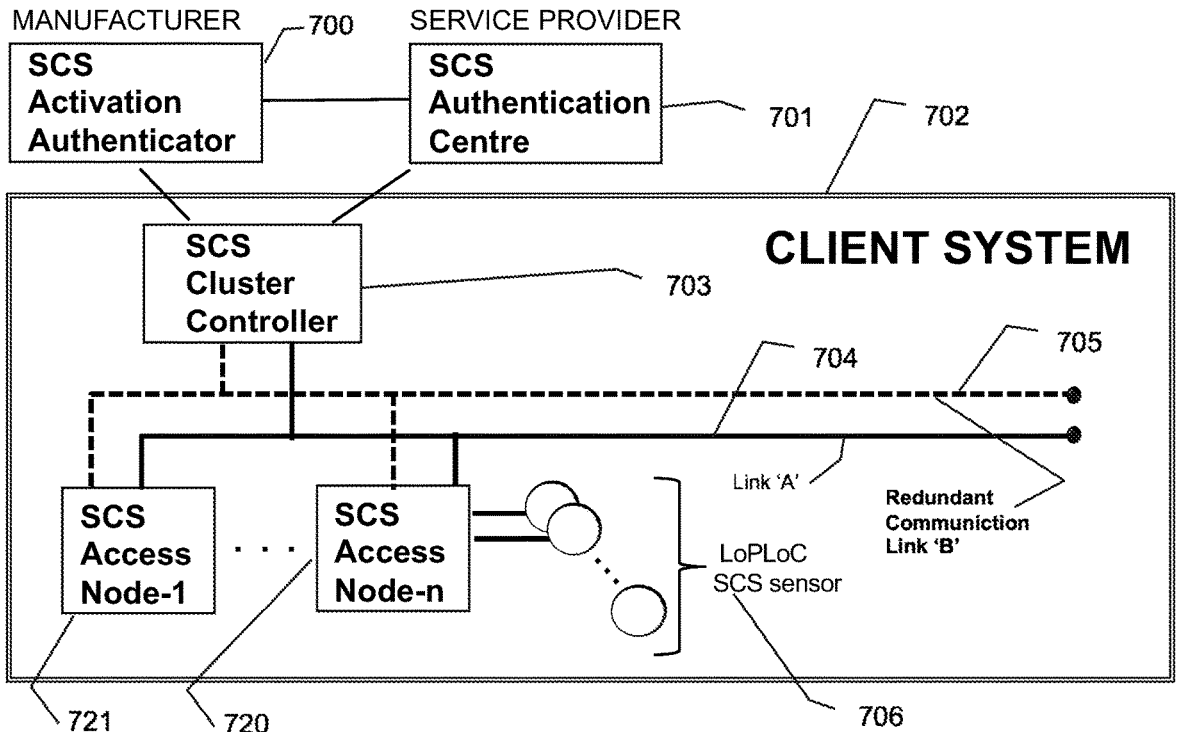

FIG. 7: SCS Systems Architecture

TABLE 1: SCS New Functions

| SCS Function | NEW Function | U.S. 10367794 Function | CAN Bus Function | MODBUS DPN3 Function |
|---|---|---|---|---|
| SCS Activation Authentication | Equipment manufacturer activation authentication | | | |
| SCS Authentication Center | Network access authentication ⋮ Mobile, Internet, Satellite, etc. | | | |
| SCS Cluster Controller | Local authentication | IoT Equipment Registry (IER) | Central Gateway Module + SCS Cluster Controller | SCADA Server + SCS Cluster Controller |
| SCS Access Node | | IoT Access Node (IAN) | | |
| SCS Redundant Communication Link | Redundant Links | | | |

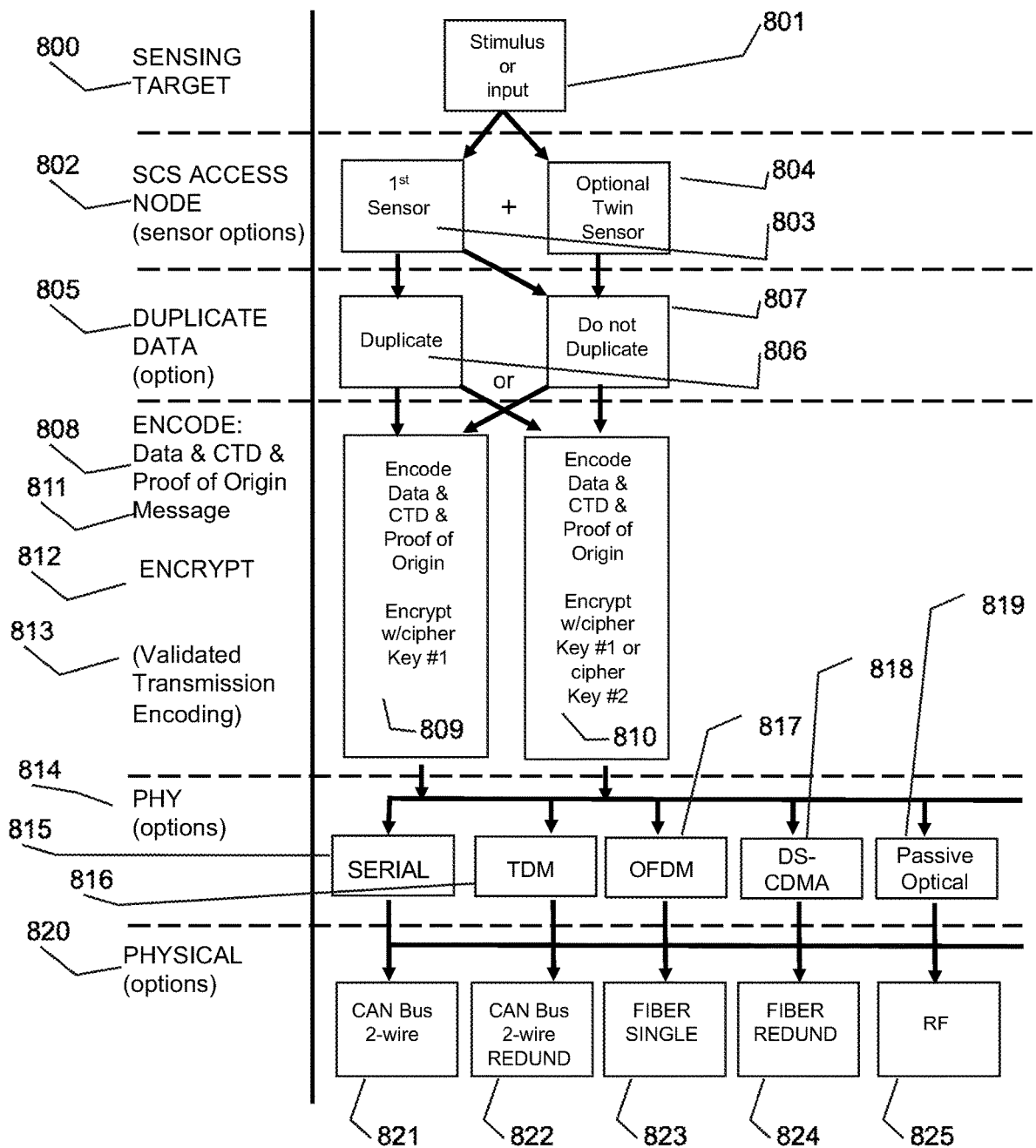
FIG. 8: SCS Redundant Message Link Options

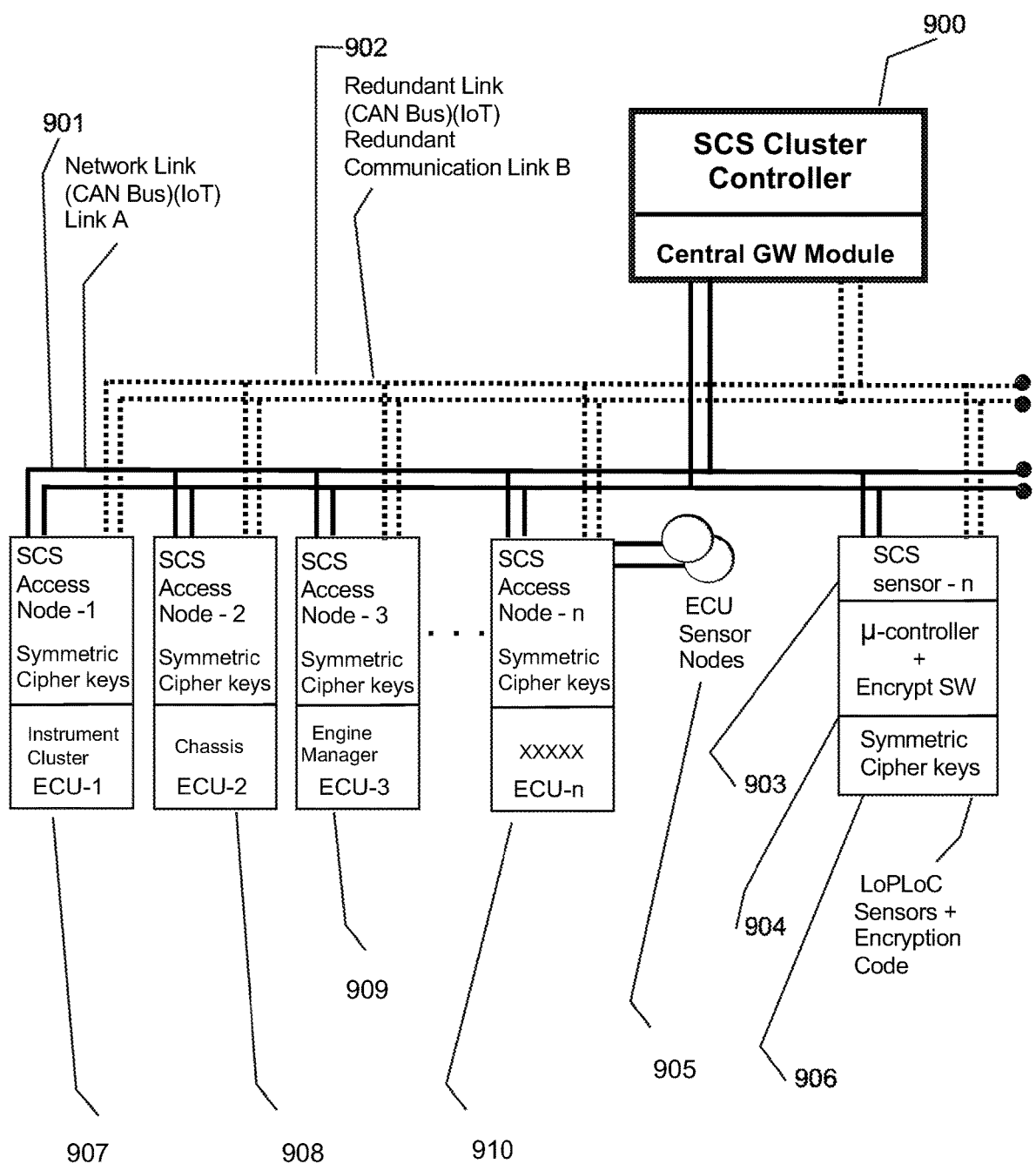
FIG. 9: SCS Systems Architecture: CAN Bus, IoT

FIG. 10: SCS Systems Architecture: SCADA
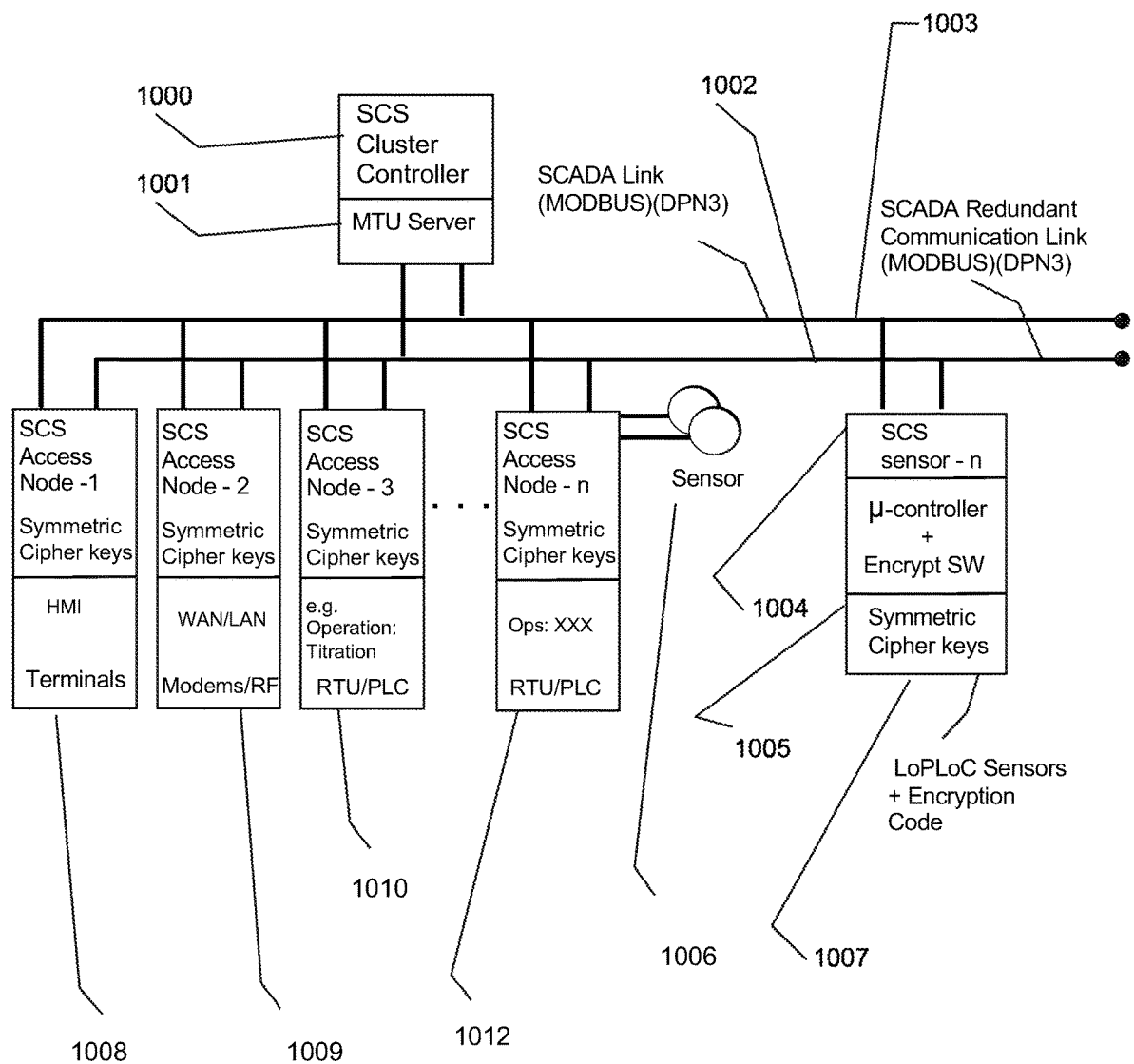

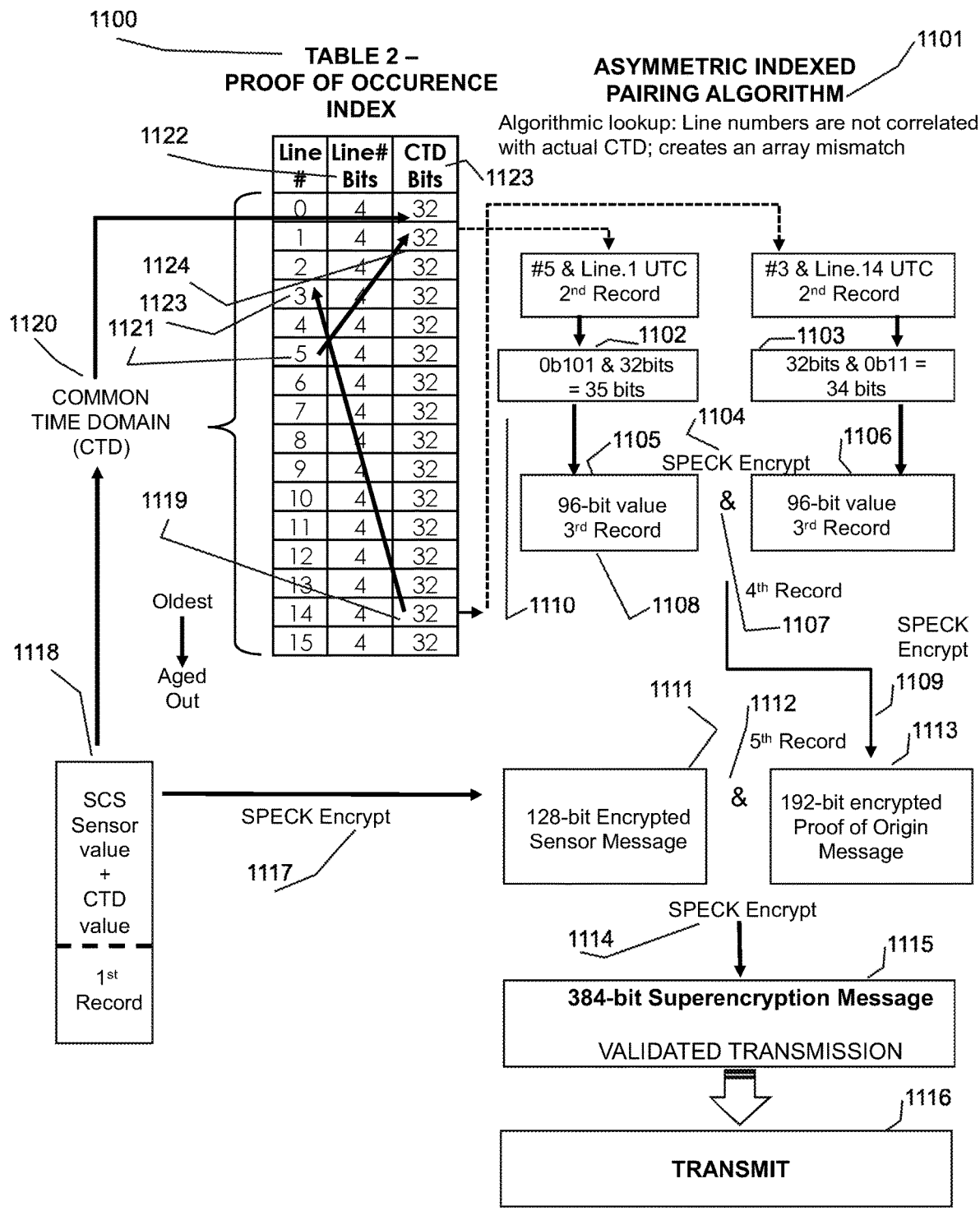
FIG. 11: Sensor Acyclic Data Encryption

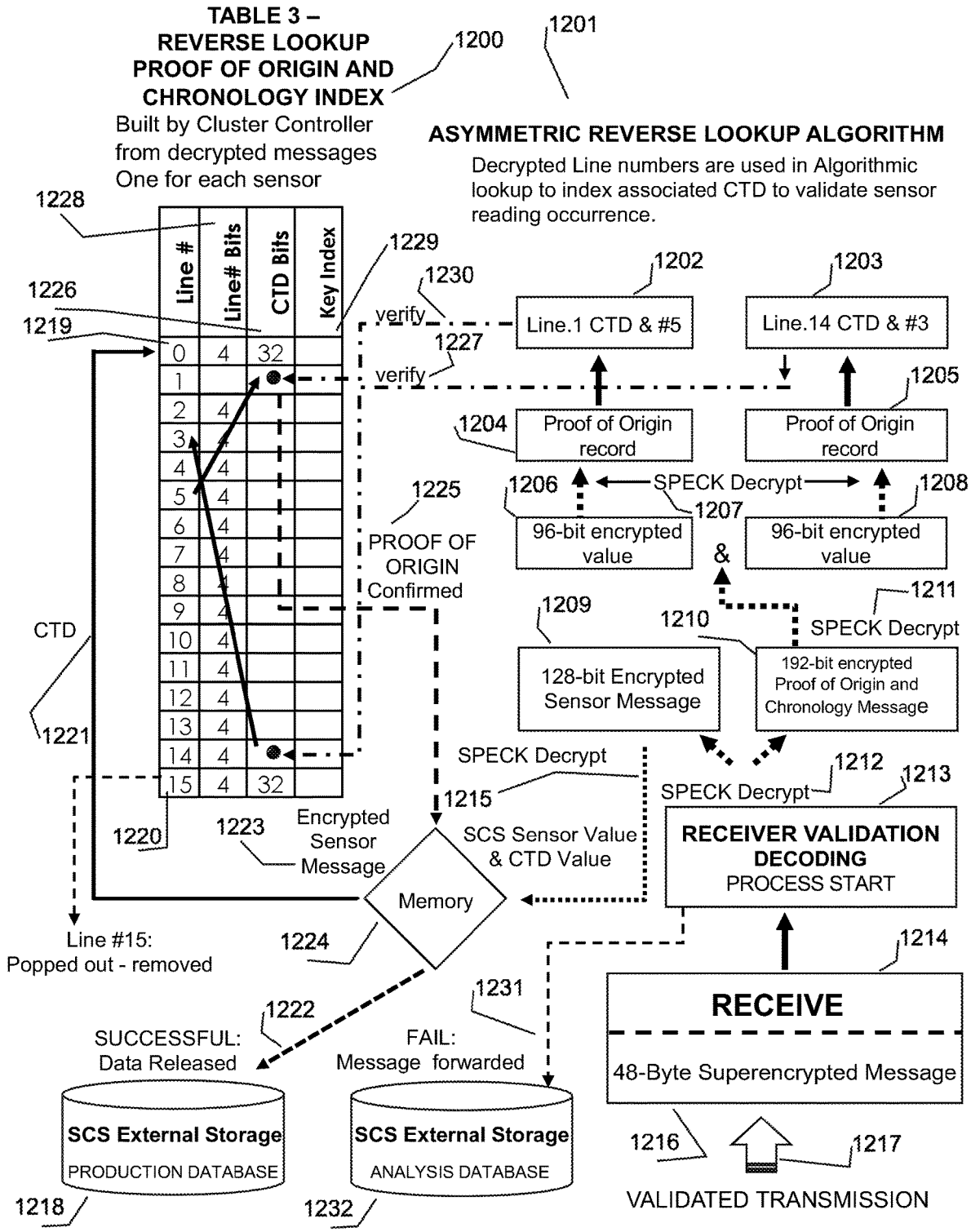
FIG. 12: SCS Cluster Controller validation against hacking or message replay

METHOD FOR USING REDUNDANT ENCRYPTION TO SECURE DATA IN SUPERVISORY CONTROL SYSTEMS

REFERENCE TO RELATED PATENTS

This application references U.S. Pat. No. 10,367,794 B2 issued on Jul. 30, 2019, entitled "METHOD AND APPARATUS FOR SECURING A SENSOR OR DEVICE", the disclosure of which is hereby fully incorporated in its entirety by reference herein.

TECHNICAL FIELD OF THE INVENTION

Embodiments of the present disclosure generally describe methods to secure hardware and software products which employ Supervisory Control Systems (SCS), inclusive of but not limited to Controller Area Network Bus (CAN Bus), Supervisory Control and Data Acquisition (SCADA), Digital Control Systems (DCS), Home Energy Management Systems (HEMS), and Internet of Things (IoT).

BACKGROUND OF THE INVENTION

Virtually every aspect of modern living is dependent upon electronic products that frequently require a Supervisory Control System (SCS) in order to function. SCS is the industry term for a data and electronic control system that may include such disparate parts as nodes, actuators, and sensors.

Functionally, SCS relies on inter-communications between Nodes, actuators and sensors these are typically electronic devices that are attached to a network, and are capable of creating, receiving, or transmitting information over a communication channel. Examples include but are not limited to: Electronic Control Units (ECUs), sensors, actuators, process control terminals, and Low Power Low Complexity (LoPLoC) devices which are principally represented by sensors.

SCS has a long and complicated technical history and its systems have not yet caught up with modern demands for anti-hacking and security protection. This is because SCS first appeared decades before cyberthreats emerged, and much of SCS' underlying current technologies remain outdated and too simple to successfully cope with cyberattacks. SCS is used extensively in controlling factories, industrial operations, energy grids, public utilities, vehicles, planes, satellite, HVAC, elevators, escalators, home security, and home/building energy management systems [REF. 1]. The SCS technologies highlighted are neither exhaustive nor limited by those described in the following paragraphs.

Controller Area Networks Bus (CAN Bus): CAN Bus is a serial network standardized under ISO 11898 that multicasts information between nodes, Electronic Control Units (ECUs), sensors, actuators, graphical displays, and end-devices. It uses a carrier sense multiple access and collision resolution technology when accessing the communication bus, and control over the queuing policies cannot be guaranteed inside the communication stacks of the electronics control units (ECUs). With initial reference to the drawings, (FIG. 1), depicts a contemporary CAN Bus system and its 2-wire physical communication system 101, 102 that connects the ECUs 104, sensors 103, graphical displays and other end devices. With initial reference to the drawings, (FIG. 2), shows the 3 versions of the CAN Bus frame formats 200, identifying the data payload sizes 205 for each in particularity. CAN Bus is used widely in such areas as transport (automobiles, trucks, motorcycles), aviation (planes, jets, rockets), satellite systems, building mechanical systems (elevators/escalators), ships, medical equipment, household appliances (washing machines, dryers, ovens), manufacturing plants, and Internet of Things (IoT) [REF. 2].

Supervisory Control and Data Acquisition (SCADA): With initial reference to the drawings, (FIG. 3), shows a contemporary SCADA system including a SCADA control host system 312 that communicates with any number of SCADA remote terminal units (RTU) 306 and programmable logic controllers (PLC) 303 to obtain sensor data 301, 304, 307, and to provide control instructions to actuators and/or for other operations purposes. SCADA is a control system that is data acquisition and event driven, consisting of networked data communications 311, graphical user interfaces 316, and computers 300, 313, 314 for high-level process supervisory management spread over wide geographies such as: Oil and Gas industry, Plant/factory automation, Water and Wastewater, Utilities (water, gas electric-grid), Agriculture/Irrigation, Manufacturing, Food and Beverage, Pharmaceutical, Death Stars and Telecommunications [REF. 3]. The application layer messaging protocol which dominates SCADA systems for manufacturing facilities is MODBUS [REF. 4], while Distributed Network Protocol version 3 (DPN3) is the de facto standard for water, sewage, and the oil gas industry [REF. 5]. With initial reference to the drawings, (FIG. 4), the 3 versions of the MODBUS frame formats identify the data payload sizes 404, 411, 418 for each in particularity. With initial reference to the drawings, (FIG. 5), the 3 DPN3 frame format for the data payload size 501 is shown.

Another form of SCADA is frequently referenced as Distributed Control System (DCS): These were originally manufacturer proprietary process control systems connecting controllers, sensors, operator terminals and actuators. DCS is process oriented, typically proprietary, and installed at large, continuous processing facilities with operations controlled onsite rather than remotely [REF. 6]. However, technology advancements have benefited DCS with lower cost commercial-off-the-shelf (COTS) equipment and resulted in SCADA becoming the dominant global DCS process control management system.

With initial reference to the drawings, (FIG. 6), details a contemporary SCS Node 600 including a Microcontroller 602, SCS Controller 603 and SCS Transceiver 604; characteristic of SCS Nodes for SCADA and CAN Bus sensor implementations are the tightly integrated designs comprising 8-bit microcontrollers (MCU) 602 for handling the data, SCS Transceiver 604 for interfacing to the hardware transport mechanisms, and the SCS Controller 603 for managing the data interface between the MCU and Transceiver. SCADA protocols were architected to be very compact and designed to send information only when the master station is polled. 2-Wire EIA-485 communication links 605, 606 continue to dominate this industry as low bandwidth protocols remain popular, especially as 2-wire links are less expensive than other solutions such as ethernet or WiFi.

Historically SCSs were created to fulfill specific application needs, however they have failed to keep up with evolving requirements of providing both communication redundancy and data security to address today's increases in hacking and data theft. The principal reason for these limitations is that SCS architectures and technologies could not presage the continual and growing hacking attacks that now necessitate data protection and redundant data delivery, although redundancy was never considered when the original SCS architectures where conceived.

Current SCSs were designed and built prior to today's easy access to computer tools which makes it simple for hackers to cripple the electronic systems upon which modern society now depends.

The requisite security SCSs must incorporate consists of the following requirements in combination which heretofore has not been identified in any conference, academic papers, featured in any contemporary SCS installations, nor can any related patents cited deliver the below combined Features 1-4:

a) Feature 1—SPEED: Failure to deliver data in a timely manner causes problems. Delayed delivery can result in life or death situations, machines failing within milliseconds, or vehicle collisions.
  b) Feature 2—REAL-TIME SECURITY: Sensors, switches, and actuators need to be protected from real-time hacking in order to prevent the data from being intercepted or modified. The only known reliable method to accomplish security real-time is through symmetrical authentication such as AES [REF. 7] or SPECK/SIMON [REF. 8] using true randomized keys. Asymmetric authentication through such methods as PKI [REF 9], Diffie-Hellman [REF. 10] or RSA [REF. 11] are not instantaneous while also necessitating significant processing power and message exchanges to function.
  c) Feature 3—REDUNDANT LINKS: The ability to guarantee verifiable and identical data delivery is critical. SCSs require a method to ensure that any message received via a redundant link is 100% identical, this also serves to validate authenticity of any received messages. A mechanism for delivering PRECISELY the same message near instantaneously helps guarantee that the message delivered is tamper-free. It is also vital in the case of life critical applications such as aircraft automation where fault tolerance is typically implemented using system redundancy. In addition, if one message is perceived to be hacked then it may indicate that the network is under attack and pre-emptive measures could be taken to contain the threat.
  d) Feature 4—LOW-COST IMPACT: Sensors, switches, actuators, and other LoPLoCs should remain simple, cost-effective and not require significant redesign nor the inclusion of powerful processors to fulfill simple functions such as sending temperature measurement, simple switch activation operations, etc.

Myriads of SCS cyberattacks have occurred due to the absence of two or more of the above four key SCS security threat Features. SCS' decades old design and high cost to deploy has prevented SCS from keeping pace with modern cyberattacks. SCS' communications and processing simplicity presents an extremely facile target for hackers which poses a challenge to implement the requisite security protection. The novel invention elaborated herein presents a practical scheme to implement Features 1-4 in SCS systems.

Critically, requiring processor intensive multi-message-exchange security schemes from SCS Nodes would not be practical and would result in delayed message delivery for time-critical applications. A common characteristic of SCS Nodes 600 (alias LoPLoC) are low performance processors (MCU) 602 this prevents them from performing additional tasks (e.g. security) which are unrelated to their primary function (e.g. temperature measuring/sending), and in some cases these SCS Nodes may not have any processing capability at all. These low complexity LoPLoC 601 devices perform merely one or perhaps only a few dedicated tasks which are critical to the system and are unable to be tasked to run additional applications, making it impossible to implement Features 1-4 due to LoPLoC 601 constraints.

With reference to Feature 3—REDUNDANT LINKS, SCADA vendors typically offer system redundancy by installing backup systems comprised of duplicate processors, networks, sensors, and actuators. However, this type of expensive infrastructure redundancy is implemented to the disadvantage of validating delivery of the precise data as disclosed in U.S. Pat. No. 9,008,809 B2 [REF. 12]. Duplicated systems are architected for hardware redundancy in case of system failure, and are not designed for verifying precise data delivery. The unique concept of verifying data through identifying the original data does not currently exist.

In summary, due to the above SCS limitations, it is impossible for current SCS Nodes 600 to address this patent application's design Features 1-4 using the extant techniques. Despite these limitations, numerous attempts there have been made to rectify these Feature limitations:

One example of this type of effort to modernize SCS is reflected in the multiple patents listed below, each of which describe various apparatus and methods for converting the SCS CAN Bus 101, 102 into 100Base-T1 Ethernet, commonly known as Automotive Ethernet; this technology purportedly enables features such as drive-by-wire and vehicle2vehicle communications: US2014/0126584A1 [REF. 13], CN102014139A [REF. 14], CN103716217A [REF. 15], US20170054574A1 [REF. 16], US20160191572A1 [REF. 17], US 2013/0159489 A1 [REF. 18], CN102546821A [REF. 19], and US 2017/0072876 A1 [REF. 20].

However, none of the aforementioned patents recite or teach any methods for the use of redundant links, nor do any cite any security methods; since none of the patents cite any security schemes, the only security available is limited to Ethernet's IEEE 802.1AE MACsec, Layer 2 of the OSI networking model which is used to protect Ethernet's network-to-network or device-to-network connections. However, MACsec requires multiple data messages between SCS Nodes to authenticate identities: supplicant (e.g. sensor, ECU, actuator), authenticator (e.g. network switch), authentication server (e.g. RADIUS or AAA). In addition, MACSec relies on the Extensible Authentication Protocol (EAP), which has proven insecure through use of hacking tools such as Rogue Gateway and "Bait n Switch" [REF. 21]. Automotive Ethernet therefore requires more costly hardware, additional software to manage, additional processing power, and yet it is still unable to comply with the required SCS features: Feature 1—SPEED, Feature 3—REDUNDANT LINK, or Feature 4—LOW-COST IMPACT.

Despite the AUTomotive Open System Architecture (AUTOSAR) consortium of auto manufacturers touting the benefits of 100 mbps speed for Automotive Ethernet, AUTOSAR has not considered the practical impact of Automotive Ethernet on LoPLoC 600 devices. The SOME/IP Protocol Specification [REF. 22] defines an Automotive Ethernet frame with a maximum of 5884 bytes. This is an excessive amount of data for a simple LoPLoC 600 device to process and could never meet standard automotive latency requirements of <10 μsec even unencrypted, thus failing to provide SCS Feature 2—REAL-TIME SECURITY. Converting CAN Bus (FIG. 1) to Ethernet is associated not only with more costly hardware: Nodes, controllers, physical-layer interfaces, complicated ECU redesigns, but also increases latency, and overheads relating to real time communication (e.g. IEEE 802.1Q) which requires time synchronization, scheduling and traffic shaping. Additionally, as Ethernet is a structured protocol that includes metadata and preamble frames sent in the clear as well as requiring synchronization, Automotive Ethernet devices are therefore more easily hacked [REF. 23]. More precisely, Automotive Ethernet does not provide any of this invention's novel Features 1-4, and thus fails to address modern SCS Security requirements.

Yet another example of an attempt to modernize the CAN Bus (FIG. 1) is US 2011/0093639 A1 [REF. 24] in which the patent proposes an after-market security apparatus marketed as 'KEELOQ®. However, Claim 12 [REF 24] defines a method for registering a KEELOQ® CAN network device through multiple message exchanges between KEELOQ® Security Peripherals all using the same initial key and requiring the Vehicle Identification Number (VIN), KEELOQ® password, and user password, encoder/decoders, a microcontroller, a digital signal processor, a programmable logic array (PLA), and an application specific integrated circuit (ASIC) [REF. 24, Claims 1-11]. Thus, this invention could not deliver SCS Feature 4—LOW-COST IMPACT, nor was SCS Feature 3—REDUNDANT LINK even discussed. It is also questionable if the system could satisfy SCS Feature 1—SPEED due to the multiple authentication messages required. In addition to the above highlighted complexities, costs, and deficiencies, the KEELOQ® technology had been documented to be hackable and therefore insecure as described by Bogdanov. [REF. 25], thus failing SCS Feature 2—REAL-TIME SECURITY.

There have also been many attempts to verify sensor data in automobiles and industrial systems which do not rely on modifying the CAN Bus (FIG. 1). There are two notable methods which attempt to statistically validate sensor data instead of protecting the data through encryption: 1) The Lyapunov-based model predictive controller (LMPC), using networked sensor measurements to improve closed-loop performance, coupled with cyber-secure explicit feedback controllers to drive a nonlinear multivariable process to its steady state. Although the networked sensor measurements may be vulnerable to cyber-attacks, the process purportedly remains immune to destabilizing malicious cyber-attacks [REF. 26]. 2) Sensor Fusion by Mitsubishi Electric and supported by Japan's New Energy and Industrial Technology Development Organization (NEDO), developed algorithms for a sensor-security technology for detecting inconsistencies that appear in multiple sensors measuring the same changes when a system is under attack [REF. 27]. Sensor Fusion's system rejects out of bound data by using secondary sensors to verify the initial sensor's reading to be valid.

Both LMPC and Sensor Fusion methods fail to protect the data through encryption, while both arguably satisfy requisite SCS Feature 1—SPEED, and subject to implementation might also satisfy SCS Feature 3—REDUNDANT LINK. However, both methods fail requisite SCS Feature 2—REAL-TIME SECURITY since both fail to protect the data from interception as the data is not protected/encrypted. Both also fail requisite SCS Feature 4—LOW-COST IMPACT due to the additional added hardware, faster processors, memory, and feedback hardware to verify the data for each sensor. Therefore, it would be impossible to rely on either method for SCS security.

While industry combines IoT and CAN Bus (FIG. 1) in the same SCS category, IoT should be differentiated from CAN Bus industrial applications (e.g. elevators, escalators, building fire systems) versus IoT consumer applications (e.g. refrigerators, washing machines, home alarm systems, Home Energy Management Systems (HEMS), environmental and urban sensor systems). The following patents attempt to address IoT specific security requirements: WO 2017/007725 A1 [REF. 28], US 2020/0236177 A1 [REF. 29], U.S. Pat. No. 11,120,145 B2 [REF. 30], WO2022199186A1 [REF. 31]. The above patents describe a variety of apparatus' and methods to provide IoT systems with security, however each of the inventions are physically distinct from the actual IoT device itself, and require separate physical ancillary apparatus and networks as integral to the inventions.

None of the afore cited IoT patents provide the required SCS Feature 1—SPEED, Feature 2—REAL-TIME SECURITY, Feature 3 LINK REDUNDANCY, or Feature 4—LOW-COST IMPACT. The principal reasons are because all the cited patents: 1) describe methods requiring multiple authentication message exchanges thus increasing message delays, 2) demand new physical apparatus requirements to connect to the IoT device/LoPLoC through a separate physical interface which increase costs, 3) fail to mention redundant links for precise message delivery confirmation.

Finally, an examination of SCS applications SCADA and DCS reveal the inherent vulnerabilities to hacking attacks of both MODBUS (FIG. 4) and DPN3 (FIG. 5) protocols. While MODBUS (FIG. 4) is the manufacturing industry's prevalent infrastructure and factory messaging protocol, it is license free and consequently not supported by any standards committees and has not developed any security improvements, thus failing to correct many of its security weaknesses such as: messages sent in clear text, no message integrity, no message authentication, simplistic message framing, and no session structure [REF. 32]. DPN3 (FIG. 5) in contrast which is also license free, has a very active user's group which charges for protocol development kits; however, the weakness in DPN3 is that although it specifies key exchanges between devices, all operational messages are transmitted in the clear and open to hacking and manipulation [REF. 33]. As a result, it is simple for a hacker to modify or insert false messages [REF. 34]. Unfortunately, both MODBUS (FIG. 4) and DPN3 (FIG. 5) (both polled protocols) were developed before security was a concern; consequently, neither have built-in security. Both standardize on function codes and data types and are byte-oriented which makes spoofing and eavesdropping attacks simple and straightforward [REF. 35].

Notwithstanding MODBUS (FIG. 4) standardization limitations, several patents cited herein demonstrate attempts to secure SCS SCADA applications for both MODBUS (FIG. 4) and DPN3 (FIG. 5): US2005/0005093 A1 [REF. 36], U.S. Pat. No. 10,257,163 B2 [REF. 37], US 2010/0183150 A [REF. 38], KR101339666B1 [REF. 39], KR101359789B1 [REF. 40].

The cited patents claim methods to authenticate devices by passing encryption keys through multiple messages similar to RSA or Diffie-Hellman for both MODBUS and DPN3. Such time-consuming and computationally intensive methods have been studied and determined impractical for SCADA, or any other manufacturing system due to the delays and impact on real-time operational demands [REF. 41 Sect 5.2 Cryptographic techniques]. In-depth academic studies to invent LoPLoC friendly SCADA protection have also concluded that Diffie-Hellman integer factorization and RSA large prime number factoring are both impractical for SCADA real-time system demands [REF. 42].

Therefore unfortunately, the cited SCADA security improvement patents fail to provide the required SCS Feature 1—SPEED, Feature 2—REAL-TIME SECURITY, Feature 3—LINK REDUNDANCY, or Feature 4—LOW- COST IMPACT. The reasons for these failures are familiar as previously documented with IoT and CAN Bus cited patents, wherein: 1) described methods require multiple authentication message exchanges thus increasing message delays, 2) demand new physical apparatus requirements to connect to the IoT device through a separate physical interface which increase costs, 3) fail to mention redundant links for precise message delivery confirmation.

In comparison, U.S. Pat. No. 10,367,794 B2 to Sayers et al, FIG. 3. 'Message flow for a reporting sensor' details a claimed apparatus that satisfies SCS Feature 1—SPEED, Feature 2—REAL-TIME SECURITY, and Feature 4—LOW-COST IMPACT. However, it may be argued that U.S. Pat. No. 10,367,794 B does not teach nor is it obvious to a person skilled in the art to satisfy SCS Feature 3—LINK REDUNDANCY through redundant links nor does it disclose any methods to successfully use redundancy for security purposes.

SUMMARY OF THE INVENTION

The invention described is directed to a security method for Supervisory Control System (SCS) networks inclusive of but not limited to Controller Area Network Bus (CAN Bus), Supervisory Control and Data Acquisition (SCADA), Digital Control Systems (DCS), Home Energy Management Systems (HEMS), and Internet of Things (IoT). The methods described herein address all of the above current art limitations by providing existing SCS with: guaranteed delivery of the encrypted and precise message, link redundancy to provide precise and identical message delivery, and to eliminate requirements for increased processing power or electrical power consumption to satisfy security, speed, and redundancy for SCS Nodes inclusive of LoPLoC devices. Using redundant message delivery to provide enhanced security has not been identified in any other prior art (e.g patents, publications, conference papers) and provides unique protection methods for SCS networks.

A further understanding of the nature and the advantages of particular embodiments disclosed herein may be realized by reference to the remaining portions of the patent application description and the attached drawings.

REFERENCES

1. "What is supervisory control?", published by ForumAutomation, Industrial Automation, December 2017, by Sivaranjith Sivaraman from Mantra Softech.
2. "What is CAN Bus (Controller Area Network) and How It Compares to Other Vehicle Bus Networks", published by DEWESoft, Feb. 19, 2021, by Grant Maloy Smith.
3. "Guide to Supervisory Control and Data Acquisition (SCADA) and Industrial Control Systems Security" published by National Institute of Standards and Technology Administration, US Dept. of Commerce, Special Publication 800-82, September 2006, by Keith Stouffer, Joseph Falco, and Karen Kent.
4. "Modbus Application Protocol Specification V1.1b3" published by Modbus.org Apr. 26, 2012.
5. "A DNP3 Protocol Primer Rev A" published by DNP Users Group March 2005.
6. "What's the Difference Between OT, ICS, SCADA and DCS?", published by Securicon May 1, 2019, by Securicon Team.
7. "Advanced Encryption Standard (AES)" published by the National Institute of Standards and Technology as the US Department of Commerce (NIST) Nov. 26, 2001, by Dworkin, Barker, Nechvatal, Foti, Bassham, Roback, Dray.
8. "SIMON and SPECK: Block Ciphers for the Internet of Things", published by National Security Agency (NSA), Jul. 9, 2015, by Beaulieu, Shors, Smith, Treatman-Clarke, Weeks, Wingers.
9. "Certified Malware: Measuring Breaches of Trust in the Windows Code-Signing PKI", published by University of Maryland, Association for Computing Machinery Oct. 30-Nov. 3, 2017, by Kim, Kwon, Dumitras.
10. "Delay and cost performance analysis of the Diffie-Hellman key exchange protocol in opportunistic mobile networks", published by Journal of Physics DOI: 10.1088/1742-6596/978 Jan. 1, 2016, by Soellestijanto, Mulladi.
11. "Serious Security Weakness in RSA Cryptosystem" published by International Journal of Computer Science Issues 9(1), January 2012, by Bakhtiari, Maarof.
12. U.S. Pat. No. 9,008,809 B2, Pub Data Apr. 14, 2015, Redundant Control For a Process Control System, by Tournier et al.
13. US2014/0126584A1 Pub Date May 8, 2014, Frame Conversion Apparatus for Converting Controller Area Network frame into Ethernet Frame and Frame Conversion Method Thereof, Hwang et al.;
14. CN102014139A Pub Date Apr. 13, 2011, Protocol Conversion Device for Vehicle FlexRay bus and Ethernet, Liu Biao et al.;
15. CN103716217A Pub date Apr. 9, 2014, Intelligent Data Repeater Based on CAN Bus Technology, Yang Weihan et al.;
16. US20170054574A1, Pub Date Feb. 23, 2017, Virtual Controller Area Network, Fei Wu et al.;
17. US20160191572A1, Pub Date Jun. 16, 2016, Ethernet AVB for Time-Sensitive Networks, Lejin K. Joy;
18. US 2013/0159489 A1, Pub Date Jun. 20, 2013, System and Method for Managing Ethernet Communication Network for Use in Vehicle; Sang Ho Cha et al.;
19. CN102546821A, Pub Date Jul. 4, 2012, Remotely-upgraded Controller Area Network (CAN) Protocol Converter, Cai Hao et al.;
20. US 2017/0072876 A1, Hardware-Accelerated Protocol Conversion in an Automotive Gateway Controller, Pub Date Mar. 16, 2017, Rajesh Padinzhara Rajan et al.;
21. "Bypassing Port Security in 2018—Defeating MACsec and 802.1x-2010", published by DEF CON 26, August 2018, #327402715, by Gabriel Ryan
22. "SOME/IP Protocol Specification #696 R22-11", published by AUTomotive Open System ARchitecture (AUTOSAR), 2022 Nov. 24.
23. "Automotive Ethernet vs Ethernet—What's the Difference?", published by Guardknox Nov. 28, 2021, by Yuri Friedman.
24. US 2011/0093639 A1, Pub Date Apr. 21, 2011, Secure Communications Between and Verification of Authorized CAN Devices, Patrick K. Richards et al.,
25. "Cryptoanalysis of the KeeLoq block cipher", published by Ruhr University Bochum, Germany, 2007, by Andrey Bogdanov.
26. "A Cyber-secure control-detector architecture for non-linear process": Scarlett Chen, Zhe Wu, Panagiatis D. Christofides. Aichee Journal. 2020; 66:e16907
27. "New Security Technology Detects Malicious Cyberattack", IEEE Spectrum, 26 Feb. 2019, by John Boyd.

28. WO 2017/007725 A1 Pub Date 12 Jan. 2017, Apparatus and Method for Establishing Secure Communication Channels in an Internet of Things (IOT) System, Britt et al.;
29. US 2020/0236177 A1, Pub Date Jul. 23, 2020, System for Distributed Intelligent Remote Sensing Systems, Becker et al.;
30. U.S. Pat. No. 11,120,145 B2, Pub Date Sep. 14, 2021, Method and System of Ensuring Interaction of Devices of the Internet of Things (IOT), Gurin et al.;
31. WO2022199186A1, Pub Date 29.09.2022, Internet-of-Things Communication System based on Quantum Technology, Wang Zhenyu et al.;
32. "Vulnerabilities of the ModBus Protocol", published by University of Piraeus, February 2018, by Evangeliou I. Evangelia.
33. "Survey on Analysis of Security Threats in DNP3 Protocol", published by International Journal of Scientific & Technology Research Volume 9, Issue 06, June 2020, by Sangewwar, Buchade.
34. "A Taxonomy of Attacks on the DNP3 Protocol" published by University of Tulsa DOI:10.1007/978-3642-047985_5, March 2009, by Papa and Shenoi.
35. "SCADA Hacking: SCADA Protocols (DNP3)" published by Hackers Arise February 2017 by OWS.
36. US2005/0005093 A1, Pub Date Jan. 6, 2005, Methods, Systems and Devices for Securing Supervisory Control and Data Acquisition (SCADA) Communications, Bartels et al.
37. U.S. Pat. No. 10,257,163 B2, Pub Date Apr. 9, 2019, Secured Process Control Communications, Rotvold et al.
38. US 2010/0183150 A1, Pub Date Jul. 22, 2010, Shared Key Management Method, Shared Key Generating Method and Message Communication Method for SCADA System, and Recording Medium, Lee et al.
39. KR101339666B1, Pub Date 2013 Dec. 4, Method and apparatus for encryption for Modbus communication, Kim ong-sil et al.
40. KR101359789B1, Pub Date 2014 Jan. 29, System and method for security of scada communication network, Lim Yong-hun et al.
41. "Security of smart manufacturing" Published by Journal of Manufacturing Systems, Vol 47, April 2018 Pages 93-106, by Nilufer Tuptuk and Stephen Hailes.
42. "Enhanced cryptographic approaches for SCADA network security', published by University of Louisville, 8-2010, by EAleed H. ElSaid.
43. "Crypto suite SPECK security services for air interface communications', published by ISO/IEC 29167-22, Part 22, 2018-11.
44. "Crypto suite SIMON security services for air interface communications", published by ISO/IEC 29167-21:2018, Part 21, 2018-10
45. "The SIMON and SPECK Ciphers on AVR 8-bit Microcontrollers, Published by National Security Agency 2014, Beaulieu, Shors, Smith, Treatman-Clark, Weeks, Wingers.
46. "Experimental performance analysis of lightweight block ciphers and message authentication codes for wireless sensor networks" Published by International Journal of Distributed Sensor Networks 2017, Vol 12(11), DOI: 101177/15501477'7744169, by Sooyeon Shin, Minwoo Kim, Takeyoung Kwon.
47. "5G; Security architecture and procedures for 5G System" published by European Telecommunications Standards Institute (ETSI), ETSI TS 133.501 v15.2.0 (2018-10).
48. "X-DeepSCA: Cross-Device Deep Learning Side Channel Attack" by D. Das, A. Golder, J. Danial, S. Ghosh, A. Raychowdhury and S. Sen, in 56th ACM.
49. "SIMON and SPECK Implementation Guide" Published by National Security Agency Jan. 15, 2019, Beaulieu, Shors, Smith, Treatman-Clark, Weeks, Wingers.
50. "Mach Zender Inteferometer and its Applications", Published by International Journal of Computer Applications® (IJCA) (0975-8887) National Seminar on Recent Advances in Wireless Networks and Communications, NWNC-2014, Mehra, Shahani, Khan.
51. "What is a Fiber Optic Splitter?", Published by FS Community Dec. 6, 2021, John.
52. "Optical Networks FTTx and Reduced Attenuation Balance with Passive Optical Splitter", Published by Carpathian Journal of Electronic and Computer Engineering, Jul. 1, 2014 pp. 30-35, Ivaniga, Ruzbarsky, Ovsenik, Turan.
53. "Two-particle bosonic-fermioonic quantum walk via integrated photonics", Published by Dipartimento di Fisica, Sapienza Universita di Roma, Piazzale Aldo Moro, 5, Roma Italy, 23 Jan. 2012, Sansoni, Sciarrino, Vallone, Mataloni, Crespi, Ramponi, Osellame.
54 "Inverse design engineering of all-silicon polarization beam splitters", Published by Proceedings of SPIE: Photonic and Photonic Properties of Engineered Nanostructures VI (Vol. 9756). [97560Y] SPIE—International Society for Optical Engineering. Proceedings of SPIE—The International Society for Optical Engineering https://doi.org/10.1117/12.2210848, Frandsen, Lars Hagedorn, Sigmund, Ole.
55 "Compact polarization beam splitter for silicon photonic integrated circuits with a 340-nm-thick silicon core layer", Published by Optica Publishing Group 2017, Vol 42, Issue 21 pp. 4243-4246, Li, Dai.
56. "An integrated-nanophotonics polarization beamsplitter with 2.4×2.4 µm$^2$ footprint", published by Nature Photonics May 2015 pp. 378-382, Shen, Wang, Poison, Menon.
57 "Digital Wavefront Measuring Interferometer for Testing Optical Surfaces and Lenses', Published by Optica Publishing Group, Applied Optics Vol 13, Issue 11, pp. 2693-2703 1974, Bruning, Herriott, Gallagher, Rosenfeld, White, Brangaccio.
58 "UMTS Networks: Architecture, Mobility and Services", published by John Wiley & Sons, Mar. 4, 2005, pp. 17-18, 357-358, by Heikki Kaaranen, Ari Ahtiainen, Lauri Laitinen, Siamäk Naghian, Valtteri Niemi.

BRIEF DESCRIPTION OF FIGURES

One embodiment of this invention and its advantages may be described with reference to the associated figures:
FIG. 1. (PRIOR ART) Controller Area Network (CAN-Bus) Architecture.
FIG. 2. (PRIOR ART) CANBus Protocol Structure.
FIG. 3. (PRIOR ART) Supervisory Control and Data Acquisition (SCADA) Architecture.
FIG. 4. (PRIOR ART) MODBUS Frame Architecture.
FIG. 5. (PRIOR ART) DNP3 Frame Architecture.
FIG. 6. (PRIOR ART) SCS Node.
FIG. 7. SCS Systems Architecture.
FIG. 8. SCS Redundant Message Link Options.
FIG. 9. SCS Systems Architecture: CAN Bus, IoT.
FIG. 10. SCS Systems Architecture: SCADA.
FIG. 11. Sensor Acyclic Data Encryption.

FIG. 12. SCS Cluster Controller validation against hacking or message replay.

DETAILED DESCRIPTION OF THE INVENTION

The following detailed description is merely exemplary in nature and is not intended to limit the invention or the application and uses of this invention. Furthermore, there is no intention to be bound by any theory presented in the preceding background of this invention or the following detailed description of exemplary embodiments. It will also be apparent to one skilled in the art that the present invention may be practiced without the specific details presented herein. Furthermore, well known features may be omitted or simplified in order not to obscure the present invention.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, a computing processing engine, or other electronic computing device, that manipulates and/or transforms data represented as physical (e.g. electronic) quantities within the computers registers and/or memories into other data similarly represented as physical quantities within the computers registers and/or memories or other information non transitory processor—readable storage medium that may store instructions, which when executed by the processor, cause the processor to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, element, units, parameters, or the like. The term set when used herein may include one or more items. Unless explicitly stated, the method embodiments described herein are not constrained to a particular order or sequence. Additionally, some of the described method embodiments or elements thereof may occur or be per formed simultaneously, at the same point in time, or concurrently.

This patent Application references U.S. Pat. No. 10,367, 794 B2 issued on Jul. 30, 2019, "METHOD AND APPARATUS FOR SECURING A SENSOR OR DEVICE" and thereby includes components defined in the aforementioned patent's apparatus and methods claims, which define but are not limited to: IoT Equipment Registry (IER), IoT Access Node (IAN), and Low Power and Low Complexity Sensor (LoPLoC).

Further, this patent Application references U.S. Pat. No. 10,367,794 B2 as relates to its application of the United States National Security Agency's (NSA) SPECK [REF. 43] and SIMON [REF. 44] family of lightweight block ciphers which has been ratified under ISO/IEC 29167-22/21:2018. This invention is however not limited by its inclusion of SPECK and SIMON block ciphers. Those skilled in the art may apply any other symmetric security method including but not limited to AES, or may choose to apply other security methods including but not limited to asymmetric security methods (e.g. PKI, Diffie-Hellman, RSA) inclusively.

According to the various exemplary embodiments herein, Supervisory Control System (SCS) networks are made more secure by encrypting the messages that are then transmitted in duplicate to a receiving SCS component via one or more physical and/or logical communication links. Multiple messages could be sent, the use of duplication should not be seen as a limitation. As SCS networks becomes more pervasive, the need to reliably verify and log the identity of SCS Nodes 600, as well as to securely transport the data they transmit becomes preponderant. It is not only important to securely transport the message such that the information remains unaltered by $3^{rd}$ parties, the network and SCS Nodes 600 also need to authenticate each other to prevent interception of the data by $3^{rd}$ parties. Message encryption suitably creates secure message delivery, and in further embodiments the encrypted message is delivered over redundant physical or logical communication links in which the data is precisely matched at the receiving end to further confirm the source. In the various embodiments the cryptographic and redundancy techniques used are independent of the underlying SCS information being transmitted, thereby allowing many of the techniques, systems and devices described herein to be readily applied in conventional SCS implementations by those skilled in the art without significant modification.

In one exemplary embodiment of this invention the underlying SCS Systems Architecture (FIG. 7) is based upon U.S. Pat. No. 10,367,794 B2, Sayers et al. architecture (FIG. 1). The entirety of the methods described for registration and communication between devices in the aforementioned patent's IoT Access Node 710 (IAN) and IoT Equipment Registry 707 (IER) are adopted herein without modification, inclusive of but not limited to the methods: Securing the IOT Access Node (Col 7:38-Col 8:24), First Network Access by Sensor/Device (Col 8:25-Col 10:30), Sensor/Device Communication with Network (Col 10:31-Col 11:26), Option for Cipher Key Rotations (Col 11:27-Col 12:24), Sensor/Device Using Multiple IOT Access Node (Col 12:25-38), and Network Logging by IOT Equipment Registry (Col 12:39-Col 13:26).

Improvements are hereby made to U.S. Pat. No. 10,367, 794 B2; as disclosed below. With initial reference to the drawings, (FIG. 7), following are the improvements: renaming of three (3) of the aforementioned patent's components to reflect new and novel functions: 1) IoT Equipment Registry 707 (IER) has been renamed SCS Cluster Controller 703, 715 to reflect its more localized network specific authentication role for each client without limiting to only IoT applications. 2) IoT Access Node 710 (IAN) has been renamed SCS Access Node 720, 721, to reflect its localized encryption and decryption role servicing the local SCS Cluster Controller 703, 715 without restricting to only IoT applications; other types of networks may be included but not limited to: CAN Bus (FIG. 1), MODBUS (FIG. 4), and DPN3 (FIG. 5). 3) The aforementioned patent's term Device has been renamed SCS sensor (alias LoPLoC) 706 for consistency with the system architecture while retaining its original function.

In addition, the exemplary embodiment presented herein improves upon U.S. Pat. No. 10,367,794 B2 and discloses three (3) new unique network security elements and related functions: 1) SCS Activation Authentication 700 is responsible for authenticating and enabling SCS Cluster Controllers 703, 715 including their related devices and functions as the central authority for any and all hardware from each manufacturer. 2) SCS Authentication Center 701 is reserved for companies that provide network services for SCS Cluster Controller 703, 715 clients and is similar to mobile network operators' Authentication Centers (AuC) [REF. 58]; such network service companies include but are not limited to: Mobile Network Operators (MNO), Internet Service Providers (ISP), and Satellite Network Providers. 3) SCS Redundant Communication Links 704, 705 which a) provide a method by which duplicated data may be transmitted to validate the source, b) confirm that the original has not been maliciously manipulated. SCS Redundant Message Link Options (FIG. 8) discloses various means for redundant message transport, all based on symmetrical encryption as disclosed in ¶146-166 following.

With reference to the drawings FIG. 9, and FIG. 10, in one embodiment SCS Cluster Controllers 900, 1000 and SCS Access Nodes 907, 908, 909, 910 are installed with the SPECK firmware or SIMON hardware cipher for encrypting and decrypting messages; SPECK is easily accommodated by current CAN Bus, IoT, and SCADA 8-32 bit processors, while SIMON does not require microprocessor support. SPECK requires only a maximum of five-hundred (500) bytes or less of program code-space. The SCS sensor 903, 1004 with its integrated microcontroller and network interface can also easily accommodate the limited processing capabilities of 8-bit processors typical of CAN Bus and SCADA sensors [REF. 45] and in this exemplary embodiment SPECK or SIMON is preferred [REF 45] as the SPECK or SIMON block ciphers are extremely fast compared to other ciphers—even on 8-bit microprocessors [REF. 46].

In this exemplary embodiment, the SCS sensor 903, 1004 is configured with at least one cipher key rotation and change synchronization algorithm and references U.S. Pat. No. 10,367,794 B2 (Claims 10-15). This algorithm ensures that the same symmetric key is never used in succession or repeatedly, and is capable of changing parts of the key by itself or on command from the SCS Access Node 907, 908, 909, 910 or SCS Cluster Controller 900, 1000. The algorithm also provides the capability to synchronize changes in parts of the key autonomously among the SCS sensor 903, 1004, SCS Access Node 907, 908, 909, 910, and SCS Cluster Controller 900, 1000 network components.

In this exemplary embodiment, the system provides Feature 2—REAL-TIME SECURITY as it is mathematically impossible for a hacker to break the message with just one attempt, especially since a symmetrical authentication method cannot rely on prior message exchanges to authenticate the receiver's identity as the key in unknown and cannot be potentially harvested from other establishment messages. The system also provides Feature 4—LOW-COST IMPACT due to the small <500-byte code footprint which would ensure that the SCS Access Nodes 907, 908, 909, 910 and SCS sensors 903, 1004 would not need to be redesigned with more expensive processors to accommodate more complex software or message exchanges in order to encrypt the data. The symmetrical key used to encrypt the message can only be decrypted by the receiving end using the same symmetrical key. In this way the system can deliver SCS Feature 1—SPEED, Feature 2—REAL-TIME SECURITY, and Feature 3—LOW-COST IMPACT. The system is fast as it does not require multiple message exchanges to authenticate the identity of the receiving party, Securing the SCS Cluster Controller 900, 1000

In one embodiment of the invention, when the SCS Cluster Controller 900, 1000 first accesses the network, the onboard security processor provides the SCS Cluster Controller 900, 1000 main processor with a registration message packet pre-encrypted which must be authenticated by the SCS Activation Authenticator 700. The method by which the registration process proceeds between the SCS Cluster Controller 900, 1000 and the SCS Activation Authenticator 700 is disclosed in U.S. Pat. No. 10,367,794 B2, Sayers et al., Securing the IOT Access Node (Col 7:38-Col 8:24) in which the IoT Access Node seeks 710 to register with the IoT Equipment Registry 707.

The aforementioned IoT Equipment Registry 707 referenced in U.S. Pat. No. 10,367,794 B2, Sayers et al. authenticates and registers all IoT Access Nodes 710 and Devices; however, in this embodiment the prior IoT Equipment Registry 707 activation function has been distributed between at least one remote SCS Activation Authenticator 700, 718 and at least one SCS Cluster Controller 900, 1000. Initially the SCS Cluster Controller 703, 715 is activated by a remote SCS Activation Authenticator 700 which provides the SCS Cluster Controller 703, 715 it's initial encryption keys. Then the SCS Cluster Controller 703, 715 in turn activates the SCS Access Nodes 720, 721 and SCS sensors 706. This helps to avoid a monolithic IoT Equipment Registry 707 processing center. There are several advantages to this method which: 1) accommodates typical operational procedures by SCADA and CAN Bus systems to re-register every component upon powering back on, as is typical of automobiles, 2) allows frequent power cycling of nodes in SCADA networks for testing, re-installation and manufacturing line changes. 3) allows the system to be more scalable in order to service the high traffic that would result from 1) and 2) above. 4) Provides autonomous network security in the instance that external networking connections fail, or should the main system be hacked such that the network must be disconnected, the local network can continue to operate in isolation.

In this embodiment the SCS Activation Authenticator 700 need only activate at least one remote SCS Cluster Controller 900, 1000 to confirm its identity and activate it for service, thereby provisioning the SCS Cluster Controller 900, 1000 with the necessary keys to manage local network SCS Nodes 600. The SCS Cluster Controller 900, 1000 will then in turn be responsible for authenticating all SCS Nodes 600 in its domain. Subject to implementation, there may be multiple distributed SCS Cluster Controllers 900, 1000, and they may be configured to re-register with the SCS Activation Authenticator 700 on a schedule or for audits as required by Service Level Agreements (SLA), business relationships, or may even register with a different SCS Activation Authenticator 700 for sourcing different parts which is common practice for both automobiles, SCADA systems and consumer IoT systems.

Securing Network Services for the SCS Cluster Controller 900, 1000

In this embodiment the at least one SCS Cluster Controller 900, 1000 is also enabled to authenticate onto various communications networks which include but are not limited to: cellular, microwave, satellite, and Internet. Each network type may mandate a different method by which authentication is accomplished: 1) ISP and other fixed infrastructure use modems and gateways with known identities and authentication is automatic 2) dial-up facilities use L2TP modems or an Authentication, Authorization, and Accounting (AAA) server such as RADIUS to authenticate users using passwords 3) cellular providers employ Authentication Centers (AuC) using SIM keys.

This invention discloses the use of a cellular SCS Authentication Center 701 to provision network services for the SCS Cluster Controller 900, 1000. Cellular networks are more available to CAN Bus and IoT related systems, although SCADA systems also benefit from mobile network's faster and more reliable data delivery. The procedures by which this authentication is performed are more rigorous than the SCS Activation Authenticator-to-SCS Cluster Controller. The SCS Authentication Center 701 is logically the same as a mobile network operator's Authentication Center (AuC) which is required to authenticate every network user by exchanging keys. The current 5G-AKA [REF. 47] standard details the method by which the SCS Cluster Controller 900, 1000 may be defined as an EDGE device for authentication onto 5G networks. Once the SCS Cluster Controller 900, 1000 is authenticated, network access for every SCS Node 600 on the same network is individually managed by the SCS Cluster Controller 900, 1000.

Message Protection Through Encryption

Once the SCS Nodes 600, SCS sensors 903, 1004 (alias LoPLoCs), and SCS Cluster Controllers 900, 1000 are all fully authenticated the SCS Nodes 600 and LoPLoC 903, 1004 are then permitted to pass messages amongst themselves. This can be accomplished using the current CAN Bus, MODBUS, or DPN3 interfaces without modification. It is only necessary to employ this invention to encrypt the data and place it within the referenced existing frame structures:

1) In one exemplary embodiment, CAN Bus networking remains unaltered with the exception that the payload 205 is now encrypted (FIG. 11). It is not necessary to modify the CAN Bus networking protocol which significantly reduces the cost to implement the disclosed invention in legacy SCS networks. The data field 205 for any of the CAN 2.0, CAN Extended, or CAN-FD is now merely encrypted and inserted in the proper location of the CAN Bus frame 205.

2) In another exemplary embodiment, MODBUS networking also remains unaltered. FIG. 12 highlights the message locations for MODBUS ASCII, MODBUS RTU, and MODBUS TCP. As with CAN Bus above, the microprocessor need only encrypt the data and insert the encrypted message into the proper existing data frame 404, 410, 418; networking protocol and message delivery is retained. It is unnecessary to modify or alter the MODBUS protocol Again this reduces cost to adapt this proposed invention for legacy MODBUS systems.

3) In another exemplary embodiment, DPN3 networking also remains unaltered as envisaged in FIG. 13. The payload is encrypted and placed in the Data 501 of the frame structure. The Header remains unaltered while DNP3 networking protocol remains the same, again reducing cost to implement the disclosed method.

Retention of the existing frame structures in each of the above satisfies three of the SCS critical security requirements: Feature 1—SPEED, Feature 2—REAL-TIME SECURITY, and Feature 4—LOW-COST IMPACT; altogether this method is fast, there is minimal impact on the existing CAN Bus (FIG. 2), MODBUS (FIG. 4), and DPN3 (FIG. 5) software architectures, and there is no need to increase processing and memory hardware costs for the already functional CAN Bus, IoT, and SCADA components.

SCS Encoding of Transmissions

In the preferred exemplary embodiment, it is beneficial to ensure that the received data is verifiably from the original source, that the data is completely valid, and has not been replayed or delivered out of order through a man-in-the-middle (MITM) attack; failure may have disastrous results in such critical applications as automobiles or airplanes which rely on precise data arriving in sequence. The disclosed preferred embodiment provides a simple and foolproof means to accomplish this additional margin of safety without any major or architectural redesign of existing systems; this is accomplished by taking advantage of the referenced encryption method and procedures as defined in U.S. Pat. No. 10,367,794 B which is proposed in this patent as an overlay on top of an already efficient CAN Bus, IoT, SCADA legacy systems as in the aforementioned.

In the preferred embodiment of transmitting a message, Validated Transmission encoding 1115, 1217 is performed by the SCS Access Node 720, 721 or the LoPLoC 903, 1004 to guarantee that data is not being replayed through an MITM attack. With initial reference to the drawings, (FIG. 11), details the Sensor Acyclic Data Encryption process; This proof of occurrence algorithm 1101 is based on two principal design considerations: 1) Both the SCS sensor 903, 1004 and the SCS Cluster Controller 900, 1000 independently build identical historic sensor reading tables. 2) The encoded Validated Transmission message carries proof of at least 2 prior sensor reports 1118. These two aspects of the design make use of encryption of an encryption, also referred to as cascade encryption to validate the occurrence of a transaction held in the Validated Transmission. Every sensor date and time of occurrence 1118 is encrypted into an encrypted sensor message and linked to at least one prior encrypted sensor Validated Transmission 1115, 1217, which is logically linked all the way to the sensor's root time instance (viz. registration and activation of the sensor). Validation of a reading is more useful if the SCS can prove the time a specific sensor reading 1118 occurred rather than the accuracy of the actual data (i.e. when did the reading actually occur?). A property of such a design is that individual verification branches can be checked for integrity without having to possess the entire tree or the entire underlying database. In this case, it is mathematically sound to verify the current Validated Transmission 1115, 1217 data through a partial message decryption (i.e. 1-2 transactions prior) without knowing the top-encryption-root (viz. registration and activation of the sensor), which may have occurred hundreds of transactions earlier. In this embodiment it is only necessary to know that two prior encryptions have been verified; this confirms the data from the current transaction is in the correct order. This protects the SCS from MITM replay attacks. The above method is able to provide this cascaded encryption environment efficiently with the LoPLoC 903, 1004 limited processing and memory requirements and thus outperforms any other documented security messaging system for LoPLoCs 903, 1004.

In one exemplary embodiment, the SCS control domain could use its own Common Time Domain 1120, 1221 (CTD) to determine the chronology of events. This CTD value 1120, 1221 could also institute time jumps such that time moves forward faster at some instances further making attempts to synchronize with the domain difficult as the hacker would need to be aware of any time jump prior to sending the message. It is thus unnecessary to use real time but instead a 32-bit counter value as all modern microprocessors contain such a counter that is used for time keeping. This would add another level of complexity to confuse the hacker. The counter could mark time in any unit (eg. second, ms, µs) as required by the system.

With reference to Sensor Acyclic Data Encryption (FIG. 11), Proof of Occurrence Index (Table 2), and SCS Cluster Controller validation against hacking or message replay (FIG. 12), Reverse Lookup Proof of Origin and Chronology (Table 3), both the SCS sensor 903, 1004 and the SCS Cluster Controller 900, 1000 have independently constructed identical index's based on the transmission and arrival times of the Validated Transmissions 1115, 1217 (validated sensor readings); the SCS Cluster Controller 900, 1000 must next decode the Validated Transmission 1115,

1217 through a receiver validation process 1213. Both Tables 2 & 3 have the identical CTD value of the prior sixteen Validated Transmissions 1115, 1217 (sensor readings), which is used by the SCS Cluster Controller 900, 1000 to algorithmically prove that the current Validated Transmission 1115, 1217 (sensor reading) is related to the prior sensor data and has arrived in the correct chronology; these independently created tables obviate the need to transmit indexes or proof of occurrence across the network which provides another layer of security. The data in both Tables 2 & 3 are changing synchronously. As each Validated Transmission 1115, 1217 is decoded and validated through a receiver validation process 1213, the most recent validated reading's CTD value 1219 (received validation) is then placed in the most current position in Reverse Lookup Proof of Origin and Chronology (Table 3) while the oldest received validation 1220 is deleted. The exception between the two tables is the SPECK or SIMON block cipher decryption key index 1229 which is stored in the key index column of Table 3; this is required by the SCS Cluster Controller 900, 1000 to verify the prior Validated Transmission 1115, 1217 sensor reading through its receiver validation process 1213. In comparison to the SCS Cluster Controller 900, as the originator of the message the SCS sensor 903, 1004 stores its encryption keys on-board, however it is unnecessary for it to also retain a copy of the key(s) used for each Validated Transmission in its Proof of Occurrence Index (Table 2). The cipher key rotation and change synchronization algorithm ensures additional key security; after each key is used as the prior key is replaced by a new key, and there is never any indication in Table 2 which key(s) were used to encrypt the message.

This exemplary embodiment proposes a method for selection of at least two separate sensor readings to create a Validated Transmission encoding 1115, 1217. In this model the chronology of the current sensor transmission is linked to the CTD value 1120, 1221 of at least two different sensor readings from different chronological events through an asymmetric indexed pairing algorithm 1101 method. This indexed pairing algorithm is synchronously constructed and is known only between the SCS Cluster Controller 900, 1000 and the LoPLoC or SCS sensor 903, 1004; this is necessary to eliminate a simple linear indexed reference between order of arrival of sensor readings 1118 and its associated CTD value 1120, 1221. In one exemplary example (FIG. 11) sixteen different LoPLoC readings from different events are listed in Table 2. The Validated Transmission process creates two proofs of prior Validated Transmissions resulting in 1102 and 1103 Secondary Records: 1) the binary value of Line #5 1121 is concatenated with the CTD value from Line #1 to produce a Secondary Record 1102. 2) the binary value of Line #3 1123 is concatenated with the CTD value from Line #14 1119 to produce a separate Secondary Record 1103. Next Secondary Records 1102 and 1103 are separately encrypted 1104 to produce two separate 96-bit Tertiary Records: 1105 and 1106. In this example above the binary line #value of Line #3 1123 and the CTD value from Line #14 1123 are not mathematically added together, they are concatenated (i.e. Line #binary value 1123 is appended to the CTD value 1119). In one embodiment the order of concatenation of the binary strings may be reversed in the second pair such that the Line #value and CTD value are never in the same order. This process is asymmetric and creates another barrier against hackers. Next the two separate binary strings 1105 and 1106 are concatenated to produce a 192-bit Fourth Record value which is once again encrypted 1109 to produce a 192-bit Fifth Record which is the final Proof of Origin and Chronology message 1113. Next the SCS sensor value is concatenated with its CTD value to produce a First Record 1118 and encrypted 1117 using SPECK or SIMON block ciphers to produce a 128-bit encrypted sensor message 1111. Said Proof of Origin and Chronology message and said encrypted sensor message are then further concatenated 1112 to create a single binary string which is then encrypted 1114 a final time with SPECK or SIMON block cipher to produce a final 384-bit superencryption message which is the proof of transmission message 1115, (alias Validated Transmission message). This method of cascaded encryptions results in a single superencrypted message which serves as the Validated Transmission 1115, 1217 proof which is transmitted to the SCS Cluster Controller 900, 1000 for the receiver validation decoding 1213 process.

SCS Validation of Received Transmissions

In the preferred embodiment of receiving a message, receiver validation 1213 decoding is performed by the SCS Cluster Controller 900, 1000 to validate that the data has not been replayed through an MITM attack and is detailed in SCS Cluster Controller validation against hacking or message replay (FIG. 12). Once transmitted by the LoPLoC or SCS sensor 903, 1004 and received by the SCS Cluster Controller 900, 1000, the superencrypted Validated Transmission 1115, 1217 message must be decoded through a series of receiver validation 1213 processes to validate and confirm that the transmission is carrying audited proof of at least two previous Validated Transmission 1115, 1217 sensor readings; receiver validation 1213 decoding is necessary to prove authenticity of the chronology of arrival of the message in question. This is accomplished in FIG. 12 through a series of decryptions 1207, 1211, 1212, 1215 which reverses the encryptions disclosed in FIG. 11. The results from the cascaded decryption process provides proof that the data received has not been manipulated.

The first step in the receiver validation 1213 decoding process is the first level decryption 1212 of the superencrypted message (alias Validated Transmission 1115, 1217) using one or more symmetric cipher keys (U.S. Pat. No. 10,367,794 B2, Sayers et al.), which may be one of many other algorithmically rotated keys previously agreed upon by the LoPLoC or SCS sensor 903, 1004 and SCS Cluster Controller 900, 1000 from the aforementioned cipher key rotation and change synchronization algorithm. This decryption separates the superencrypted 1115, 1217 message into its component parts: the encrypted 128-bit encrypted sensor message 1209, and an encrypted 192-bit binary string 1210. The Validated Transmission 1115, 1217 process must prove that said 192-bit binary 1210 can result in a valid proof of origin confirmation 1225. The SCS Cluster Controller 900, 1000 next decrypts 1215 the 128-bit encrypted sensor message 1209 and stores it temporarily in memory 1224 while an asymmetric reverse lookup algorithm further cascade decrypts 1211 the 192-bit binary 1210 to use as verification proofs of prior transmissions 1227, 1230 comprised of prior Validated Transmission 1115, 1217 encodings.

The second step is the second level decryption 1211 as disclosed in FIG. 12 is based upon the requirement to prove that a hacker did not substitute a false message by using the correct encryption key(s). This guarantee of authenticity is accomplished by additional cascade decryptions. This next step requires two additional stages of decryption using the key rotation schedule from the Reverse Lookup Proof of Origin and Chronology FIG. 12, Key Index column Table 3 1229. These symmetrical keys are known by both the LoPLoC or SCS sensor 903, 1004 and the SCS Cluster Controller 900, 1000 with the agreed key rotation scheme stored in the key index column 1229. This second level decryption of the 192-bit message 1211 results in two 96-bit strings 1206, 1208. Each of these two 96-bit messages are in turn decrypted by a third level SPECK or SIMON block cipher decryption operation 1207, resulting in two undecrypted binary strings 1204, 1205. The SCS Cluster controller 900, 1000 then separates these two strings into each of their component parts: a 32-bit CTD value and a binary value from zero to fifteen representing a line number 1228 in the Reverse Lookup Proof of Origin and Chronology Index Table 3. Using these two values 1204, 1205 for each decrypted string, the SCS Cluster Controller 900, 1000 uses the same asymmetric indexed pairing algorithm previously used in FIG. 14 Table 2 to create the Validated Transmission encoding, but in reverse. If the lookup returns valid matches to the lookup Table 3, then the SCS Cluster Controller 900, 1000 has authenticated the Proof of Origin and Chronology message 1225, has completed the receiver validation process 1213, and has proof of validity.

Once the SCS Cluster Controller 900, 1000 is able to prove receiver validation 1213 of the message, the 128-bit LoPLoC 1223 message is released 1222 from memory 1224 for storage in the SCS external storage for the Production Database 1218, and its CTD value 1221 is placed in Line #0 1219 of Table 3, while simultaneously shifting all the other entries down the table and removing the oldest item Line #15 1220. The process of decoding the Validated Transmission 1213 and successfully matching the decoded data 1227, 1230 with Table 3 provides the SCS Cluster Controller 900, 1000 proof that the superencrypted 1115, 1217 message was properly encrypted; the successful decryption of the 128-bit encrypted sensor message 1209 is final proof of authentication to the SCS Cluster Controller 900, 1000 of the message's origin and chronology and the LoPLoC data 1118, 1222 can finally be released to SCS external storage for the Production Database 1218. However, if the decryption process fails or the SCS Cluster Controller 900, 1000 cannot authenticate the Proof of Origin and Chronology message 1225, the received Validated Transmission 1217 is forwarded in its entirety to SCS external storage 1232 for analysis.

Although it is likely that any system may eventually be hacked, the disclosed exemplary embodiment employing the processes of Validated Transmission and receiver validation eliminate any likelihood of a successful real-time attack without substantial effort as it is incumbent upon the hacker to successfully hack through the entire thread of cascaded encryptions to either successfully create false messages or attempt a replay attack However, even if successful in hacking the system unless they have been passively hacking and decrypting values for an extended period of time in order to observe and collect encoding and decoding data, it is a virtual certainty the hacker cannot recreate FIG. 12 Table 3 Reverse Lookup Proof of Origin and Chronology unless they have large samples of data to build their own real-time table which cannot realistically be synchronized with the target SCS Cluster Controller real-time; they must also have hacked Table 3 key index in order to possess all the keys. However, since the system rotates and/or modifies the keys, the hacker must select the correct key rotation as well as modifying the key thus presenting another level of hacking difficulty. Assuming that the above roadblocks appear insurmountable to the hacker, they may attempt repeated attacks hoping for a flaw in the system or to launch a denial of service attack; however frequent receiver validation failures would naturally result in operational procedures taking an SCS sensor and SCS Cluster Controller offline for maintenance.

A successful attack is only possible if the system has not implemented the redundant links disclosed in this invention. However, if redundant links as disclosed in this embodiment are implemented, the hacker would either have to send the same false message on all redundant links, or risk sending a conflicting message on only one of the links, which would cause the SCS Cluster Controller to reject the transmission immediately. The above messaging method in conjunction with SCS Feature 3—REDUNDANT LINK renders the SCS impenetrable.

SCS Redundant Communication Links to Guarantee Message Delivery

In the preferred embodiment of this patent application, the methods for establishing SCS Redundant Message Links Options (FIG. 8) are herein disclosed and complement the above security method for Validated Transmission and receiver validation. These methods provide for near simultaneous delivery and validation of identical messages. Redundant message links may be defined as but not limited to different physical mediums, different frequencies, different time domains, and different wavelengths. The availability of redundant message links provides both security as well as identical message delivery guarantee; various methods are disclosed in FIG. 8 allowing those skilled in the art to select the most appropriate method. The redundant links have the added advantage of offering a fault tolerant network that is less likely to fail.

In the preferred embodiment redundant message links provide two (2) crucial advantages when securing SCS: 1) A redundant message link provides an alternate physical or logical route (e.g. different physical mediums, different frequencies, different time domains, or different wavelengths), for the message to reach the destination. In the case that one of the links fails the redundant link helps guarantee that the identical message is delivered. Redundancy of identical message delivery may be critical for medical or automotive applications. 2) Receiving an identical message also serves to guarantee both received identical messages are valid. It would be nearly impossible to hack into two or more links simultaneously, intercept multiple messages which have been encrypted with one or perhaps two or more different keys, which are continually updated, hack one or more encrypted messages, change the message content, re-encrypt the data using the correct keys, and deliver the messages within a reasonable timeframe expected from SCS components. The time sensitive nature of the message negates any attack that might take longer than the transit time of the message. Once a message has been received, repeating the contents of the message is no longer useful.

In one exemplary embodiment of Feature—3 REDUNDANT LINKS FIG. 8 the SENSING TARGET 800 is excited and digitizes the input 801; the input 801 is read at the SCS NODE LOCATION 802 which may consist of a single SCS Sensor 803, (alias LoPLoC) or optionally a twin sensor 803 receiving the same input 801. The digital data is then processed by the microprocessor(s) subject to implementation and may optionally DUPLICATE 806 the data for further handling. Following the above, the microprocessor then processes the data to create the Validated Transmission encoding 813 for Table 2—Proof of Occurrence Index (FIG. 14). The microprocessor reads its CTD value and concatenates its binary form with both the sensor's binary data 801 and Proof of Origin and Chronology message 811, 1113; subject to implementation the microprocessor then either uses a single key to encrypt 812 each copy 809, or encrypts each copy with separate keys 810. The final encrypted Validated Transmission encoding 813 includes the aforementioned Proof of Origin and Chronology message encoding 1113 concatenated with the encrypted sensor message binary data 801. The sensor readings are encrypted through the methods disclosed in U.S. Pat. No. 10,367,794 B2, Sayers et al. Device Communication with Network (Col 10:31-Col 11:26), and Option for Cipher Key Rotations (Col 11:27-Col 12:24), The encrypted message(s) are next formatted by the PHY 814 and PHYSICAL 820 portions of the process for transmission to either SCS Control Center(s) 312, or SCS Cluster Controller(s) 900, 1000.

As referenced above, the designer may decide to implement a twin sensor 803. A twin sensor 803 is defined as a duplicate sensor that during manufacture has been calibrated such that when excited by the same environmental stimuli the digital outputs from both are only nominally different, or within a small acceptable variation range. Subject to calibration of the sensors, this method is similar to Mitsubishi's Sensor Fusion design in which two different sensor readings are compared at the receiving SCS Node after decryption and an acceptable variance is calculated. This method is more expensive and requires careful calibration of each type of sensor in order to guarantee acceptable variations in sensor readings.

Several PHY 814 options are available to the designer in this exemplary embodiment of the invention:

1) Serial 815: encrypt messages and transmit them serially one after the other without any modification. This is easiest to intercept;
2) Time-Division-Multiplexing (TDM) 816: Multiplex and interleave each encrypted message into a separate time-domain. This is next lowest cost to implement on low cost SCS sensors and also relatively easy to intercept, but provides another level of difficulty for hackers to overcome;
3) Orthogonal-Frequency-Division-Multiplexing (OFDM) 817: Transmit each encrypted message on a different frequency while synchronizing messages with all SCS Nodes. This is more difficult to intercept if the frequency is unknown or hopped in an unknown sequence;
4) Direct-Sequence-Code-Division-Multiplexed-Access (DS-CDMA) 818: Multiplex bandwidth as well each SCS Node uses a different code orthogonal to other SCS Node sequences which further secures the encrypted message. This is extremely difficult to intercept;
5) Passive Optical Networks (PON) 819: PON non-electrical fiberoptic transceivers are becoming very cost effective for more security critical CAN Bus, IoT, and SCADA applications. Fiberoptic communications are resilient to electro-magnetic interference making this particularly valuable for SCS applications in airplanes, space, and medical applications. They are also virtually impossible to intercept (e.g. wire-tap) without alerting the user of the connection.

In the final design selection of the SCS Redundant Communication Link, the architect must choose one of five, but not limited to five different physical 820 transmission mediums:

1) CAN Bus 2-wire 821: This is the standard in many applications today and lowest cost to install. It uses a multi-master protocol, but can easily incorporate TDM that allows multiple SCS Nodes to use the same physical wiring. However, while this configuration allows two messages to be transmitted simultaneously by employing logical redundancy it does not provide any physical redundancy; missing physical redundancy is one reason why there are so many problems with CAN Bus today. It is not necessary to apply any PHY modifications such as TDM, OFDM, or DS-CDMA to implement, however advisable to do so;
2) CAN Bus 2-wire redundant 822: This is the simplest and lowest-cost method to provide physical redundancy. It is not necessary to apply any PHY modifications such as TDM 816, OFDM 817, or DS-CDMA 818 to implement, however advisable to do so;
3) Fiber Networking Single 823: This passive technology can transmit a maximum of forty (40) kilometers without any significant chromatic dispersion. Multiple messages can be transmitted on a single PON which reduces cost but does not provide the more desirable physical redundancy;
4) Fiber Networking Redundant 824: This provides for a redundant physical link which can become expensive when considering the need to double the number of PON transceivers; however, this method provides the best protection as fiber is also immune to side-band electromagnetic hacking techniques [REF: 48].
5) RF Transmission 825: Radio technologies come in many flavors from Industrial, Scientific, Medical (ISM) bands which are free but have limited range and noisy, to subscription services from local cellular operators which are priced based on bandwidth. SCS do not require much bandwidth and can be less expensive, especially as IoT is a market that cellular operators are expanding utilizing their 5G investments.

Fiberoptic redundancy for security can be further improved through the application of interferometer beam splitting, and in particular the Mach Zehnder Interferometer model is useful for detecting small differences [REF. 50]. Beam splitting [REF. 51] is frequently used and deployed in such modern applications as PON to the home [REF. 52] and more recently for quantum computing [REF. 53]. Integrated photonics engineering advancements in manufacturing of beam splitters and lasers in silicon [REF. 54], [REF. 55] have shrunk to nano size footprints [REF. 56], while the capability to digitally measure constructive and destructive optical interference from splitting beams has been available since 1974 [REF. 57].

In one exemplary embodiment the well known MACH-Zender [REF. 50] method can be used to detect hacking. In this case a sensor's digital data is converted to light impulses and passed through a polarizing beam splitter. One beam of polarized light is transmitted through one fiber to the receiving end, and the split differentially polarized light is transmitted through another separate fiber. Both polarized beams represent the same sensor data and are recombined at the receiving end. If there have not been any modifications in either beam (i.e. unhacked), then the beams will be convergent and the resulting beam when converted to digital data can be decrypted. If, however there has been the slightest change in either of the polarized beams whether in delay of the message, or any digital changes in the message, this will result in destructive interference of the combined beams which when converted back to data will result in a rejected and undecryptable transmission.

Fiberoptic transmission of data as in the above embodiment is desirable in such applications as, but not limited to vehicles, airplanes, and satellites not only for the significant weight reduction over copper electrical wiring, but also for light's natural immunity to electromagnetic interference. This method guarantees that the fiberoptic SCS message received remains precisely the original unhacked SCS data, which has become paramount as terrorism continues to increase.

In this preferred exemplary embodiment, each SCS Node has a minimum of two or more physical and/or logical connections directly addressable to send and receive messages. The ability to access multiple physical/logical links satisfies SCS Feature 3—LINK REDUNDANCY which provides the benefits previously discussed. These may be comprised of but not limited to electrical wiring, fiberoptics, and radio. The current ISO 11898 standard for multicasting information between nodes through carrier sense multiple access and collision resolution already functions very well for time and life critical SCS uses such as automotive, airplanes and SCADA, and it is unnecessary to convert these networks to more complicated and expensive TCP/IP based implementations. It is only necessary for the SCS Node to transmit the data either in its entirety or in a packetized format on multiple physical/logical links through its current multi-access interface. The receiving end need simply accept the message(s) as normal.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without corresponding use of other features without departing from the scope and spirit as set forth. Therefore, many modifications may be made to adapt a particular situation or material to the essential scope and spirit.

We claim:

1. A method implemented using at least one hardware processor by executing a program in a memory for provisioning a validated transmission data system for Supervisory Control System (SCS) networks including a plurality of SCS Access Nodes, a plurality of SCS sensors, and a Common Time Domain (CTD) value, the method comprising: an SCS Access Node configured with at least one sensor; the SCS Access Node configured with at least one redundant communication link; the SCS Access Node configured with at least one Proof of Occurrence Index and at least one asymmetric indexed pairing algorithm; the SCS Access Node configured to store one or more symmetric cipher keys; the SCS Access Node configured with at least one cipher key rotation and change synchronization algorithm; the SCS Access Node reading the CTD value from the SCS network; the SCS Access Node concatenating the SCS sensor value with the CTD value into a first record; the SCS Access Node placing a copy of the CTD value from the first record into the first index position of the Proof of Occurrence Index; the SCS Access Node processing the asymmetric indexed pairing algorithm and randomly selecting two Proof of Occurrence Index records exclusive of the first index position of the Proof of Occurrence Index; the asymmetric indexed pairing algorithm cross concatenating the CTD value and the line number value of the randomly selected two Proof of Occurrence Index records to produce two secondary records; the SCS Access Node separately encrypting each of the two secondary records into two tertiary records; the SCS Access Node concatenating the two tertiary records into a fourth record and encrypting it into a Proof of Origin and Chronology message; the SCS Access Node encrypting the first record into an encrypted sensor message; the SCS Access Node concatenating the Proof of Origin and Chronology message and the encrypted sensor message into a fifth record and encrypting it into a Validated Transmission message and the SCS Access Node transmitting the Validated Transmission message on at least two separate redundant communication links.

2. The method of claim 1 including a plurality of SCS Access Nodes.

3. The method of claim 1 using a LoPLoC as an SCS sensor receiving stimuli to create Validated Transmission messages.

4. The method of claim 1 using a twin SCS sensor to receive identical stimuli.

5. The method of claim 1 deriving the CTD value from the Universal Time Coordinate (UTC).

6. The method of claim 1 wherein the SCS Access Node duplicates the concatenated SCS sensor value and the CTD value.

7. The method of claim 1 wherein the SCS Access Node processes data using the SPECK or SIMON block ciphers.

8. The method of claim 1 wherein the SCS Access Node uses SPECK or SIMON to encrypt the two secondary records created by the asymmetric indexed pairing algorithm to produce two tertiary 96-bit encrypted records.

9. The method of claim 8 wherein the SCS Access Node concatenates the two tertiary 96-bit encrypted records into a fourth record and encrypting the result using SPECK or SIMON to produce a 192-bit encrypted Proof of Origin and Chronology message.

10. The method of claim 1 wherein the SCS Access Node concatenates the CTD value with the SCS sensor value to produce a 128-bit record.

11. The method of claim 10 wherein the SCS Access Node encrypts the 128-bit record using SPECK or SIMON to produce a 128-bit encrypted record sensor message.

12. The method of claim 11 wherein the SCS Access Node concatenates the 192-bit encrypted value Proof of Origin and Chronology message with the 128-bit encrypted record sensor message into a fifth record and encrypting it with SPECK or SIMON to produce a 384-bit encrypted Validated Transmission message.

13. A method implemented using at least one hardware processor by executing a program in a memory for provisioning a receiver validation data system for Supervisory Control System (SCS) networks including a plurality of SCS Cluster Controllers, a plurality of SCS external storage, and a Common Time Domain (CTD) value, the method comprising: an SCS Cluster Controller configured with at least one redundant communication link; the SCS Cluster Controller configured with at least one Reverse Lookup Proof of Origin and Chronology Index and at least one asymmetric reverse lookup algorithm; the SCS Cluster Controller configured to store one or more symmetric cipher keys; the SCS Cluster Controller configured with at least one cipher key rotation and change synchronization algorithm; the SCS Cluster Controller reading the CTD value from the SCS network; the SCS Cluster Controller receiving a Validated Transmission message on at least one redundant communication link; the SCS Cluster Controller decrypting the Validated Transmission message into an encrypted Proof of Origin and Chronology message and an encrypted sensor message; the SCS Cluster Controller decrypting the encrypted sensor message into an SCS sensor value and a CTD value and storing them in the SCS Cluster Controller for further processing; the SCS Cluster Controller decrypting the encrypted Proof of Origin and Chronology message into two further encrypted values; the SCS Cluster Controller decrypting the two further encrypted values into two Proof of Origin records; the SCS Cluster Controller processing the two Proof of Origin records using the asymmetric indexed pairing algorithm and matching them to the Reverse Lookup Proof of Origin and Chronology Index records; the SCS Cluster Controller successfully matching the decrypted two Proof of Origin records to the Reverse Lookup Proof of Origin and Chronology Index records moving the SCS sensor value from the SCS Cluster Controller to an SCS external storage and copying the CTD value from the SCS Cluster Controller to the first index position of the Reverse Lookup Proof of Origin and Chronology Index; and the SCS Cluster Controller failing to match the decrypted two Proof of Origin records to the Reverse Lookup Proof of Origin and Chronology Index forwarding the Validated Transmission message to an SCS external storage for analysis.

14. The method of claim 13 including a plurality of SCS Cluster Controllers.

15. The method of claim 13 deriving the CTD value from the Universal Time Coordinate (UTC).

16. The method of claim 13 wherein the SCS Cluster Controller processes data using SPECK or SIMON block ciphers.

17. The method of claim 13 wherein the SCS Cluster Controller decrypts the Validated Transmission message using SPECK or SIMON into a 128-bit encrypted sensor message and a 192-bit encrypted Proof of Origin and Chronology message.

18. The method of claim 17 wherein the SCS Cluster Controller decrypts the 128-bit encrypted sensor message using SPECK or SIMON into a CTD value and an SCS sensor value and storing them in the SCS Cluster Controller memory for further processing.

19. The method of claim 18 wherein the SCS Cluster Controller decrypts the 192-bit encrypted Proof of Origin and Chronology message using SPECK or SIMON into two 96-bit encrypted values.

20. The method of claim 19 wherein the SCS Cluster Controller decrypts the two 96-bit encrypted values using SPECK or SIMON into two Proof of Origin records each comprised of a CTD value and a line number value.

21. The method of claim 20 wherein the SCS Cluster Controller processes the two Proof of Origin records using the asymmetric reverse lookup algorithm and comparing the two CTD values and the two line number values to the Reverse Lookup Proof of Origin and Chronology Index records.

22. The method of claim 21 wherein the SCS Cluster Controller successfully matching the two Proof of Origin records to the Reverse Lookup Proof of Origin and Chronology Index records deleting the oldest record from the Reverse Lookup Proof of Origin and Chronology Index.

23. The method of claim 21 wherein the SCS Cluster Controller successfully matching the two Proof of Origin records to the Reverse Lookup Proof of Origin and Chronology Index records copying the CTD value from the SCS Cluster Controller to the first index position in the Reverse Lookup Proof of Origin and Chronology Index and moving the SCS sensor value from memory to the SCS external storage.

24. The method of claim 21 wherein the SCS Cluster Controller failing to match the decrypted Proof of Origin records to the Reverse Lookup Proof of Origin and Chronology Index forwarding the Validated Transmission message to an SCS external storage for analysis.

\* \* \* \* \*